(12) United States Patent
Ojard

(10) Patent No.: US 7,327,765 B1
(45) Date of Patent: Feb. 5, 2008

(54) HOME PHONE LINE NETWORKING NEXT GENERATION ENHANCEMENTS

(75) Inventor: Eric J. Ojard, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 1020 days.

(21) Appl. No.: 10/421,981

(22) Filed: Apr. 22, 2003

Related U.S. Application Data

(63) Continuation-in-part of application No. 10/077,653, filed on Feb. 15, 2002, and a continuation-in-part of application No. 10/077,652, filed on Feb. 15, 2002.

(60) Provisional application No. 60/374,359, filed on Apr. 22, 2002.

(51) Int. Cl.
  H04J 1/00 (2006.01)
  H04B 1/38 (2006.01)
  H04B 1/02 (2006.01)

(52) U.S. Cl. .................. 370/482; 375/295; 455/91

(58) Field of Classification Search ............. 375/295; 370/482
  See application file for complete search history.

(56) References Cited

U.S. PATENT DOCUMENTS 6,259,893 B1 * 7/2001 Kroeger et al. ............ 455/61
6,549,544 B1 * 4/2003 Kroeger et al. ............ 370/482
6,583,662 B1 * 6/2003 Lim .......................... 327/553
2003/0139151 A1 * 7/2003 Lifshitz et al. ............. 455/91

FOREIGN PATENT DOCUMENTS

EP    1 337 084 A2 *    8/2003

* cited by examiner

*Primary Examiner*—Jay K. Patel
*Assistant Examiner*—Blanche Wong
(74) *Attorney, Agent, or Firm*—Garlick, Harrison & Markison; James A. Harrison

(57) ABSTRACT

New version devices of a home phone line network may operate on a first carrier frequency (within the new version frequency band) while old version devices may operate at a second carrier frequency (within the old version frequency band). Preamble, header, and trailer portions of a new version signal include a plurality of spectral copies of a baseband modulated signal. One or more of these spectral copies of the baseband modulated signal is/are indistinguishable from corresponding components of an old version signal. The new version signal is transmit filtered to have a negatively sloping power spectral density in order to maintain a constant power level in relation to old version signals and to have slope that is opposite of binder crosstalk so as to form, with the average crosstalk, a constant level white noise floor.

24 Claims, 23 Drawing Sheets

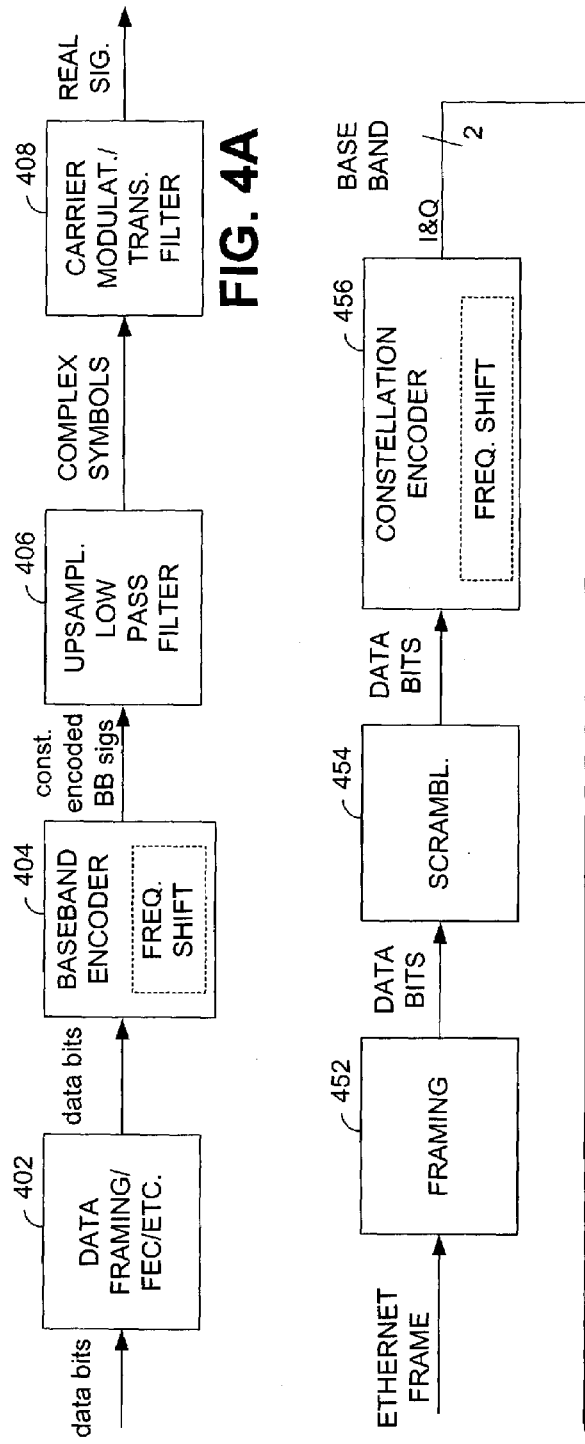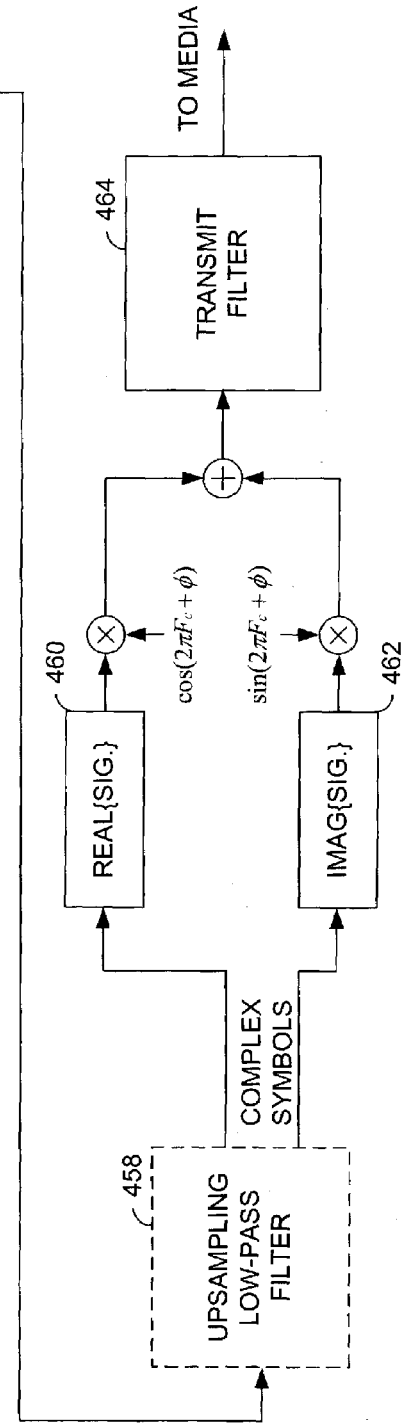

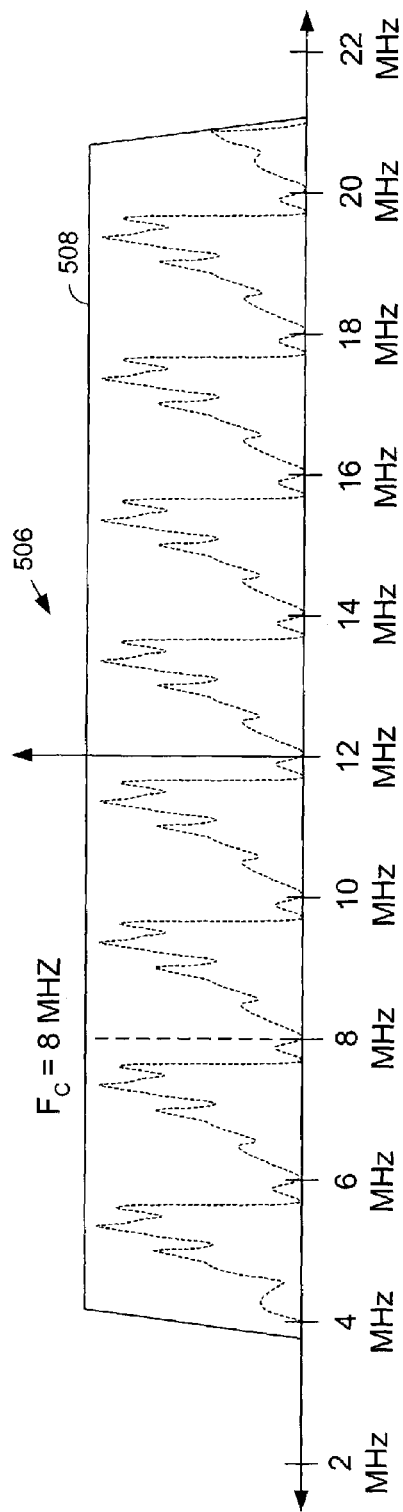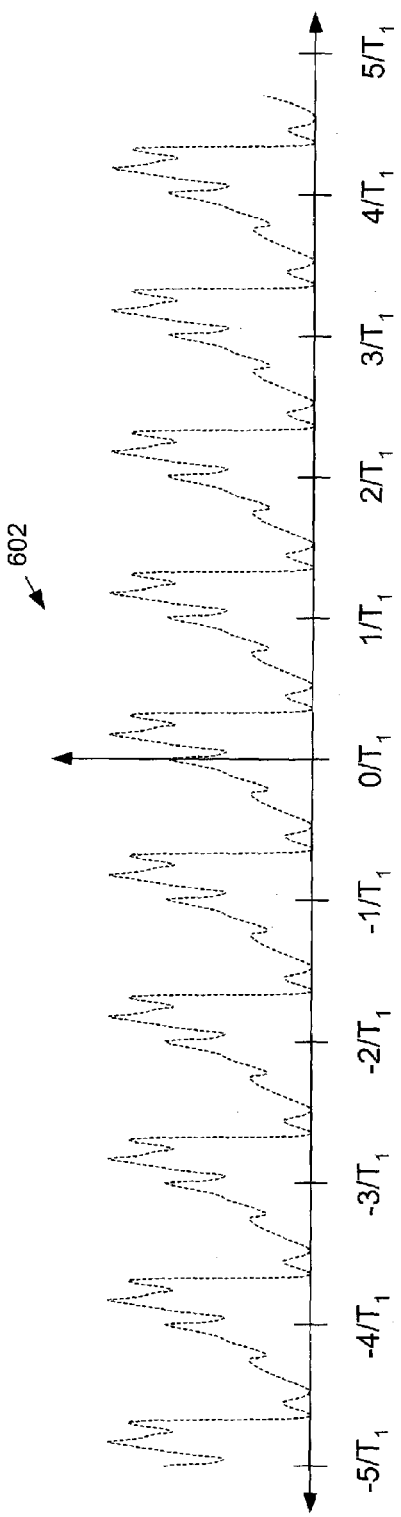
FIG. 5C
FIG. 6A

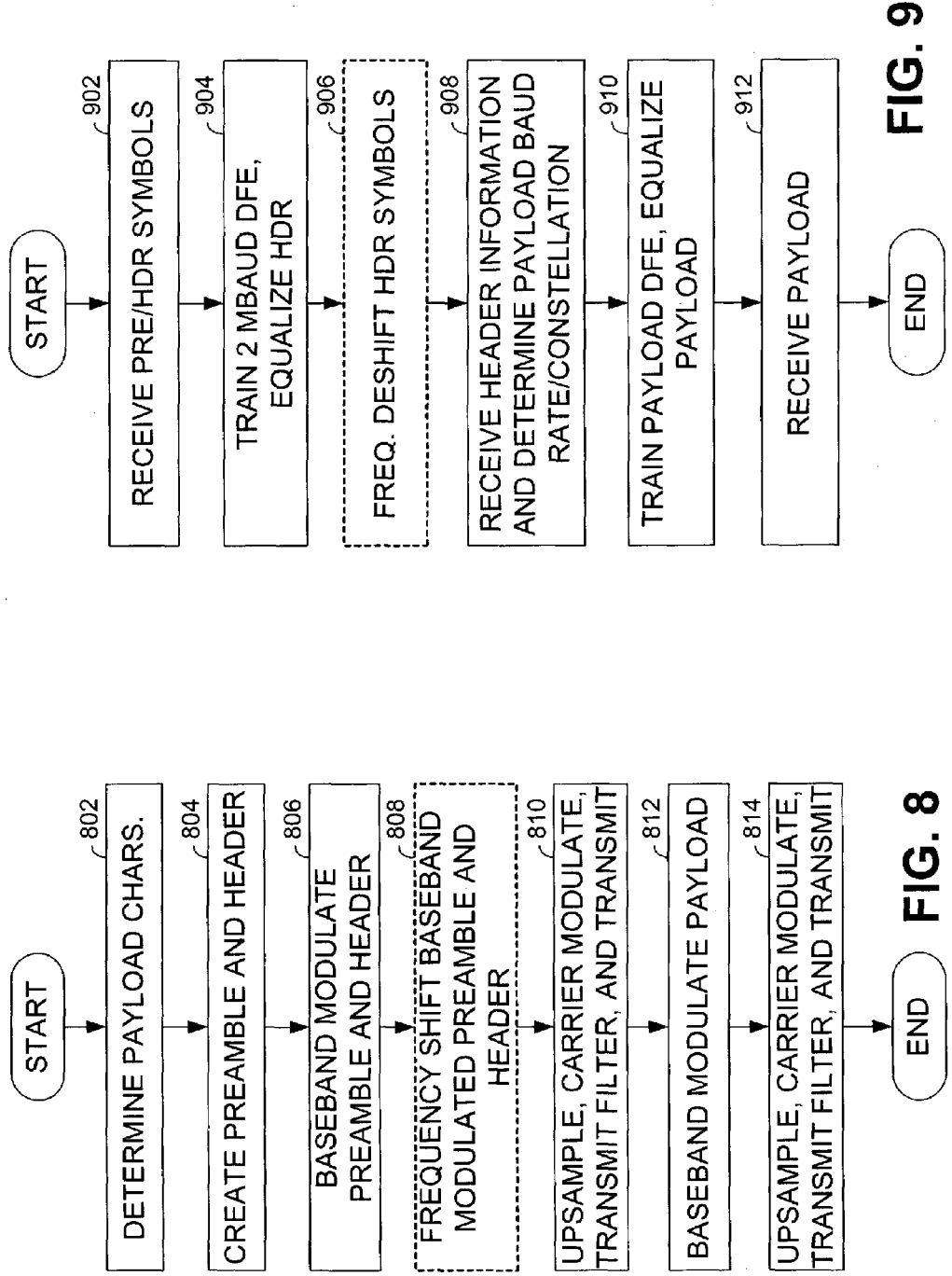

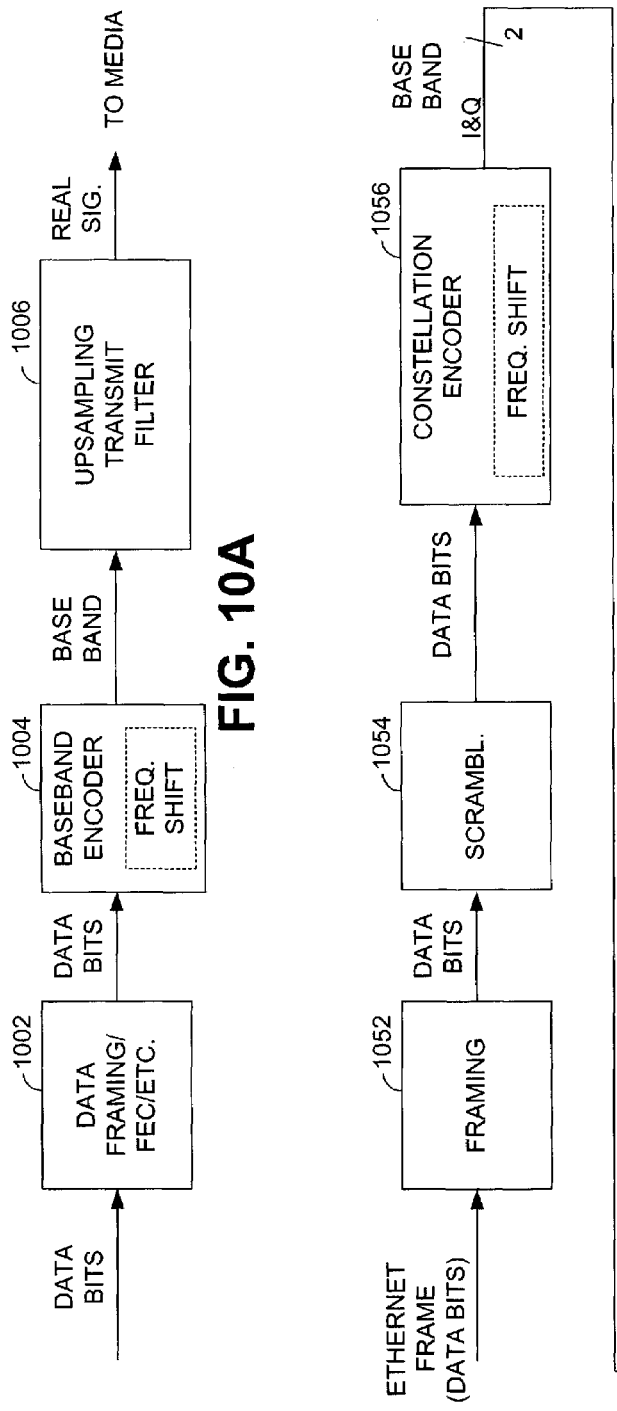
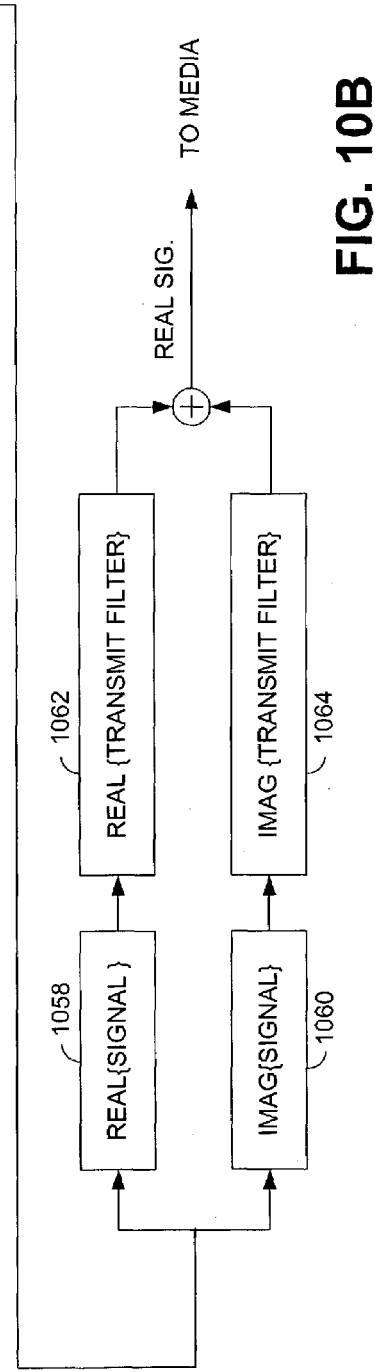
FIG. 10A
FIG. 10B

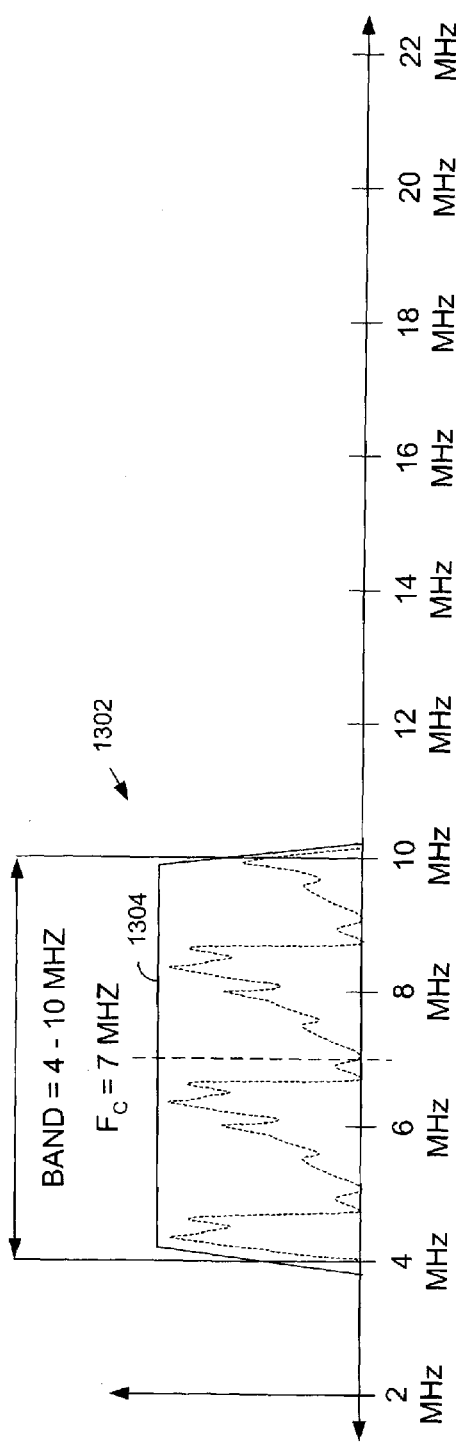
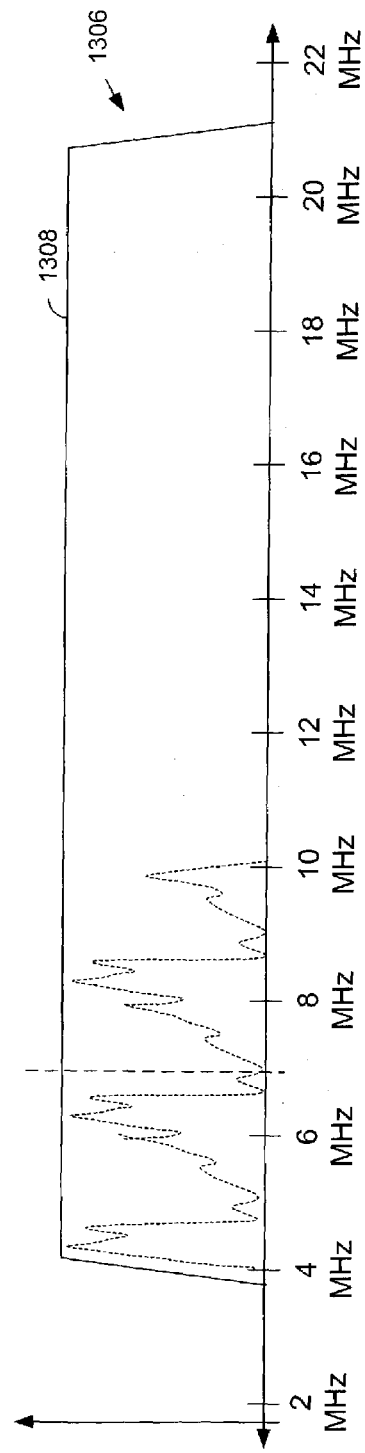
FIG. 13A
FIG. 13B

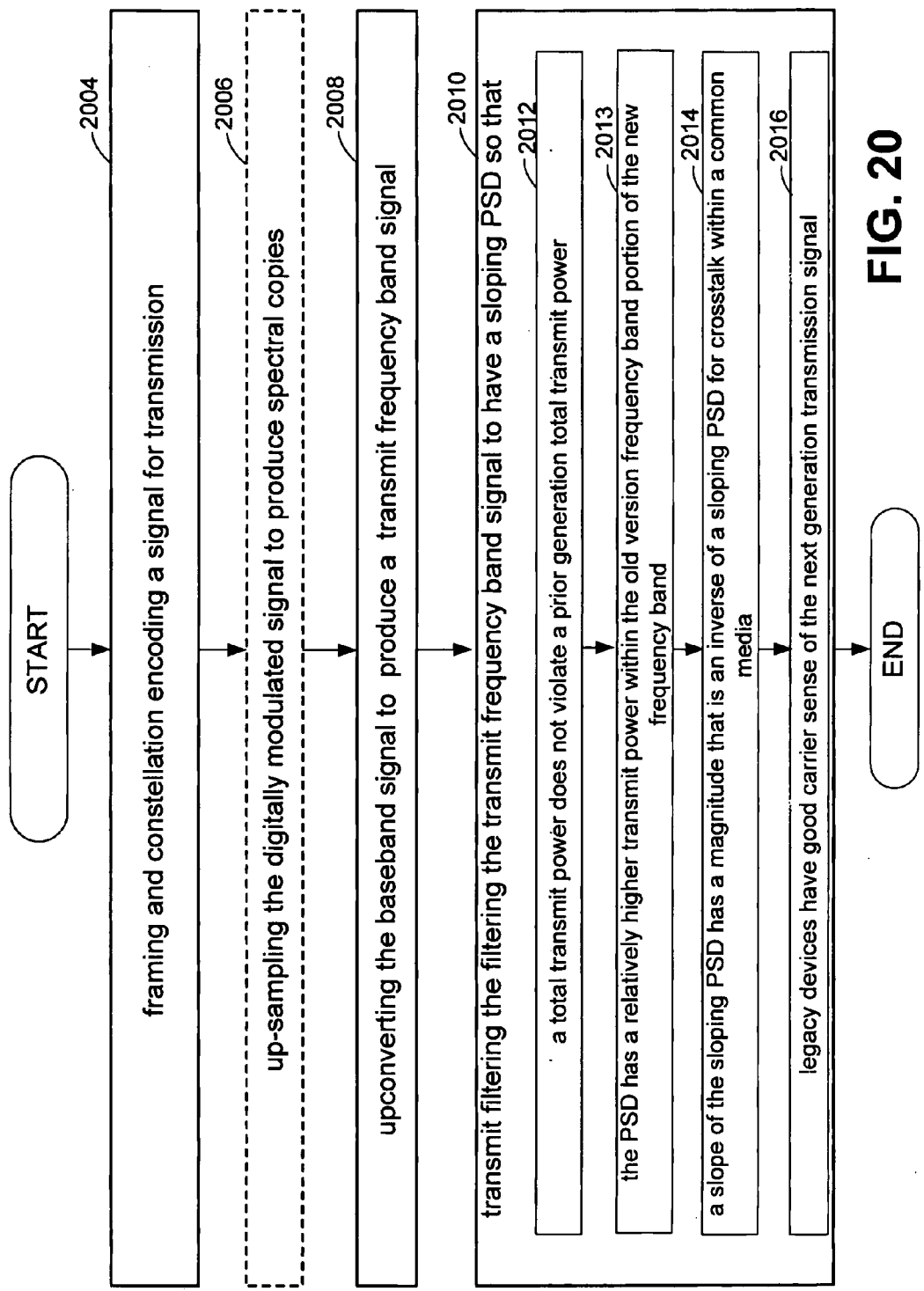

HOME PHONE LINE NETWORKING NEXT GENERATION ENHANCEMENTS

CROSS REFERENCE TO RELATED APPLICATIONS

The present U.S. Utility Patent Application claims priority pursuant to 35 U.S.C. § 119(e) to U.S. Provisional Patent Application which is hereby incorporated herein by reference in its entirety and made part of the present U.S. Utility Patent Application for all purposes having U.S. Provisional Application Ser. No. 60/374,359, entitled "Home Phone Line Networking Next Generation Enhancement", filed Apr. 22, 2002, expired.

The present U.S. Utility Patent Application claims priority pursuant to 35 U.S.C. § 120, as a continuation-in-part (CIP) to the following U.S. Utility Patent Applications which are hereby incorporated herein by reference in their entirety and made part of the present U.S. Utility Patent Application for all purposes:

1. U.S. Utility application Ser. No. 10/077,653, entitled "Carrier Based Backwards Compatible Data Networking Transmitter, Receiver, and Signal Format", filed Feb. 15, 2002, which issued as U.S. Pat. No. 7,242,732 on Jul. 10, 2007.

2. U.S. Utility application Ser. No. 10/077,652, entitled "Carrierless Backwards Compatible Data Networking Transmitter, Receiver, and Signal Format", filed Feb. 15, 2002, which issued as U.S. Pat. No. 7,068,728 on Jun. 27, 2006.

FIELD OF THE INVENTION

This invention relates generally to wired communications; and more particularly to wired packet data network communications.

BACKGROUND OF THE INVENTION

Packet data networks, their structure, and their operation are generally known. Examples of packet data networks include Local Area Networks (LANs), Wide Area Networks (WANs), and the Internet, among others. Packet data networks may be wired, wireless, or a combination of wired and wireless networks. Particular examples of networks include wired Ethernet LANs (IEEE 802.3 networks), wireless LANs (IEEE 802.11 networks), and Home Networks (HomePNA networks), among others. Each of these networks services data communications between groups of intercoupled network clients. As network client data exchange demands have increased, operating capabilities of these networks have also increased. For example, wired Ethernet LANs first serviced data communications at relatively low data throughput rates, e.g., 10 MBPS but now service data communications at relatively higher data rates, e.g., 100 MBPS, 1 GBPS, and higher. HomePNA networks have also evolved to support greater data rates with each HomePNA Specification revision.

The HomePNA Specification sets forth operations that, when implemented, allow a plurality of network devices to communicate with one another via premises telephone wiring, e.g., unshielded twisted pair (UTP) wiring. A currently existing version of the HomePNA Specification is known as the HomePNA 2.0 Specification. The HomePNA 2.0 Specification specifies a frequency band of 4-10 MHz, a carrier frequency of 7 MHz, preamble/header/trailer symbol rates of 2 MBaud, payload symbol rates of 2 and 4 MBaud, and constellations of between 2 and 8 bits/symbol. In a typical HomePNA network installation, a plurality of network devices, e.g., computers, share the premises telephone wiring with telephones and other devices that access the telephone network via the telephone wiring.

With HomePNA networks as well as other networks, each network device is usually compliant with one particular version of a corresponding operating standard, e.g., the HomePNA 2.0 Specification. In most installations, it is desirable for devices that support differing versions of the operating standard to share a common physical media. For example, in a HomePNA network, it is desirable for some network devices that support an old version of the HomePNA Specification to share the UTP wiring with other network devices that support a new version of the HomePNA Specification. However, inherent incompatibility typically exists between network devices supporting old versions of the standard as compared to network devices supporting new versions of the standard. With some operating standards, such as the HomePNA Specification, newer versions require operation in a wider frequency band. To maintain compatibility with existing standards and legacy devices, however, the total transmit power level should remain the same between old version legacy devices and new version devices. One approach for maintaining the same power level for a new version signal with a greater frequency range is to reduce the power spectral density of the signal. With this approach, however, old version systems may not sense a transmission from a new version device that is intended for it. Thus, when a corresponding network is upgraded, all network devices are typically modified so that they all support the new version of the standard. In this fashion, all network devices will support the higher data rates of the new version. Unfortunately, upgrading from an old version of the standard to a new version of the standard requires the purchase of additional hardware and/or software that may be significantly expensive.

Thus, there is a need in the art for devices that support a new version of an operating standard but that are backwards compatible with devices that support old versions of the operating standard. With this backwards compatibility operation, the higher rates of the new version of the standard must also be supported between new version devices. Further, these devices must embody a methodology that simplifies bandwidth compatibility between old version devices and new version devices.

SUMMARY OF THE INVENTION

In order to overcome the previously described shortcomings of packet data networks as well as additional shortcomings of the prior devices, new version devices operating according to the present invention include a transmitter structure that produces a backwards-compatible new version signal that may be received and sensed by old version devices. New version devices also include a receiver structure that receives both new version signals and old version signals. According to the present invention, new version devices operate within a frequency band that is wider than and overlaps a frequency band for old version devices. To address the inherent incompatibility between new version devices and old version devices, a new version signal includes a spectral component that appears, from the perspective of an old version device, to be an old version signal. Using this spectral component of the new version signal, a new version device transmits control information and data on the HomePNA network that is received by the intended receive device, as well as an old version device. Accordingly, both the new and old version devices can read the control information and data to enable each to determine whether the corresponding message is for it. According to one structure of the new version signal, the new version signal includes a plurality of spectral copies of a baseband modulated signal that reside within the new version frequency band. One (or multiple) of these spectral copies of the baseband modulated signal also resides within the old version frequency band and is/are indistinguishable from the old version signal. Throughout this application, two signals that differ only in frequency-dependent magnitude and phase are considered indistinguishable, since these differences could be attributed to the communications channel, which can introduce arbitrarily large amounts of frequency-dependent attenuation.

Likewise, the old version signal, when operated upon by a new version device, is indistinguishable from the new version signal (at corresponding symbol rates). Specifically, the old version signal appears to be a new version signal with part of the frequency band highly attenuated by the channel. Since receivers must be capable of receiving signals over such channels, they can receive old version signals in the same manner, without prior knowledge of the signal type. Thus, the new version signal also supports the transmission of control information and payload from old version devices to new version devices. According to one structure of the old version signal and the new version signal of the present invention, the old version signal includes a spectral copy of a baseband modulated signal that resides within the old version frequency band which is a subset of the new version frequency band. This spectral copy of the baseband modulated signal also resides within the new version frequency band and, when operated upon by the new version device, may be processed as if it were a new version signal.

In one embodiment of the new version signal, all preamble, header, and trailer portions of a new version signal include a component (one of a plurality of spectral copies of a baseband modulated signal) that is indistinguishable from an old version signal. However, the new version signal is formed to include this component for payload transfer as well when a new version device transmits data to an old version device. When a new version device transmits data to another new version device, the payload portion of the new version signal may be incompatible with the old version device. Based upon the contents of the header, however, an old version device determines that the payload is not for it intended and ignores the payload.

The new version signal of the present invention may include a frequency-shifted portion and a non frequency-shifted portion. In such case, the frequency-shifted portion includes a plurality of spectral copies of a baseband modulated signal that are transmitted within the new version frequency band which includes, as a subset, the old version frequency band. One (or more) of these spectral copies of the baseband modulated signal is indistinguishable from an old version signal. Frequency shifting is performed so that at least one spectral copy of the baseband modulated signal is correctly formed within the old version frequency band such that it is indistinguishable from an old version signal. In this embodiment, absent the frequency shifting operations, the new version signal would be incompatible with old version devices. With this embodiment, non-payload portions of the new version signal, i.e., preamble, header and trailer, are shifted in frequency for all operations. However, payload portions of the new version signal are frequency shifted only when intended for old version devices (or when transmitting at a symbol rate consistent with old version devices).

In order to address transmission power level restrictions and to maintain backwards compatibility with old version devices, the invention includes a transmit filter that transmit filters an output transmission signal to have a sloping power spectral density. More specifically, a transmit filter coupled to receive a digitally modulated signal transmit filters the digitally modulated signal to produce a transmit signal, wherein the transmit signal has a sloping power spectral density (PSD) that meets format requirements of both an old version signal and a new version signal. The sloping PSD of the transmit signal produced by the transmit filter slopes downwardly with frequency across a new version frequency band, wherein the new version frequency band is wider than and overlays an old version frequency band. In one embodiment of the invention, the sloping PSD has a slope that is proportional to the inverse of the average crosstalk coupling characteristic of the media crosstalk (e.g., other signal lines within a common binder). Accordingly, the average crosstalk resulting from the new version signal forms a constant white noise floor within the new version frequency bandwidth. In one home phone line network, the gain of average crosstalk increases at 15 dB/decade. Accordingly, the sloping PSD of the new version signal has a slope that is equal to −15 dB/decade.

In one embodiment of the invention, the transmit filter transmit filters the output transmission signal to have a maximum PSD that is slightly below a PSD of an old version signal to enable an old version receiver to sense and interpret the transmission signal. The sloping PSD slopes downward from the maximum value at a slope of −15 dB/decade to a minimum value that is found at the highest frequencies of the new version signal band. The present invention, as described above, is advantageous in that it provides for a total power value that is equal to a total transmit power value of an old version signal. Moreover, by transmit filtering the transmission signal to have a negatively sloping PSD, and by having maximum PSD values at the lower frequencies of the transmission signal, namely, at the frequencies of the old version and new version signals (where the new version signal overlaps the old version signal), good carrier sense is provided for the old version legacy devices thereby enabling the old version devices to sense and detect a transmission signal produced by a new version device. Thus, the signal format of the present invention provides the significant benefits of being fully backwards compatible between old version devices and new version devices and of supporting high data rate operations between new version devices. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

FIG. 4A is a block diagram generally illustrating the components of a carrier-based transmitter that operates according to the present invention;

FIG. 4B is a block diagram illustrating in more detail the components of a carrier-based transmitter operating according to the present invention with particular applicability to a home networking installation;

FIG. 5C is a graph illustrating the power spectral density of the signal of FIG. 5B after modulation with a 12 MHz new version device carrier and that is overlaid with a transmit filter corresponding to the new version device;

FIG. 6A is a graph illustrating the power spectral density of a plurality of spectral copies of a frequency shifted baseband modulated signal carrying a preamble and header that is formed according to the present invention;

FIG. 8 is a logic diagram illustrating transmit operations according to the present invention;

FIG. 9 is a logic diagram illustrating receive operations according to the present invention;

FIG. 10A is a block diagram generally illustrating the components of a carrier-less transmitter that operates according to the present invention;

FIG. 10B is a block diagram illustrating in more detail the components of a carrier-less transmitter operating according to the present invention with particular applicability to a home networking installation;

FIG. 13A is a graph illustrating the power spectral density of an old version signal that is modulated with a 7 MHz carrier and transmit filtered with an old version device transmit filter;

FIG. 13B is a graph illustrating the power spectral density of the old version signal of FIG. 13A overlaid with a receive filter of a new version device;

FIG. 20 is a flow chart illustrating operation of the present invention.

DETAILED DESCRIPTION OF THE INVENTION

Figure 1:
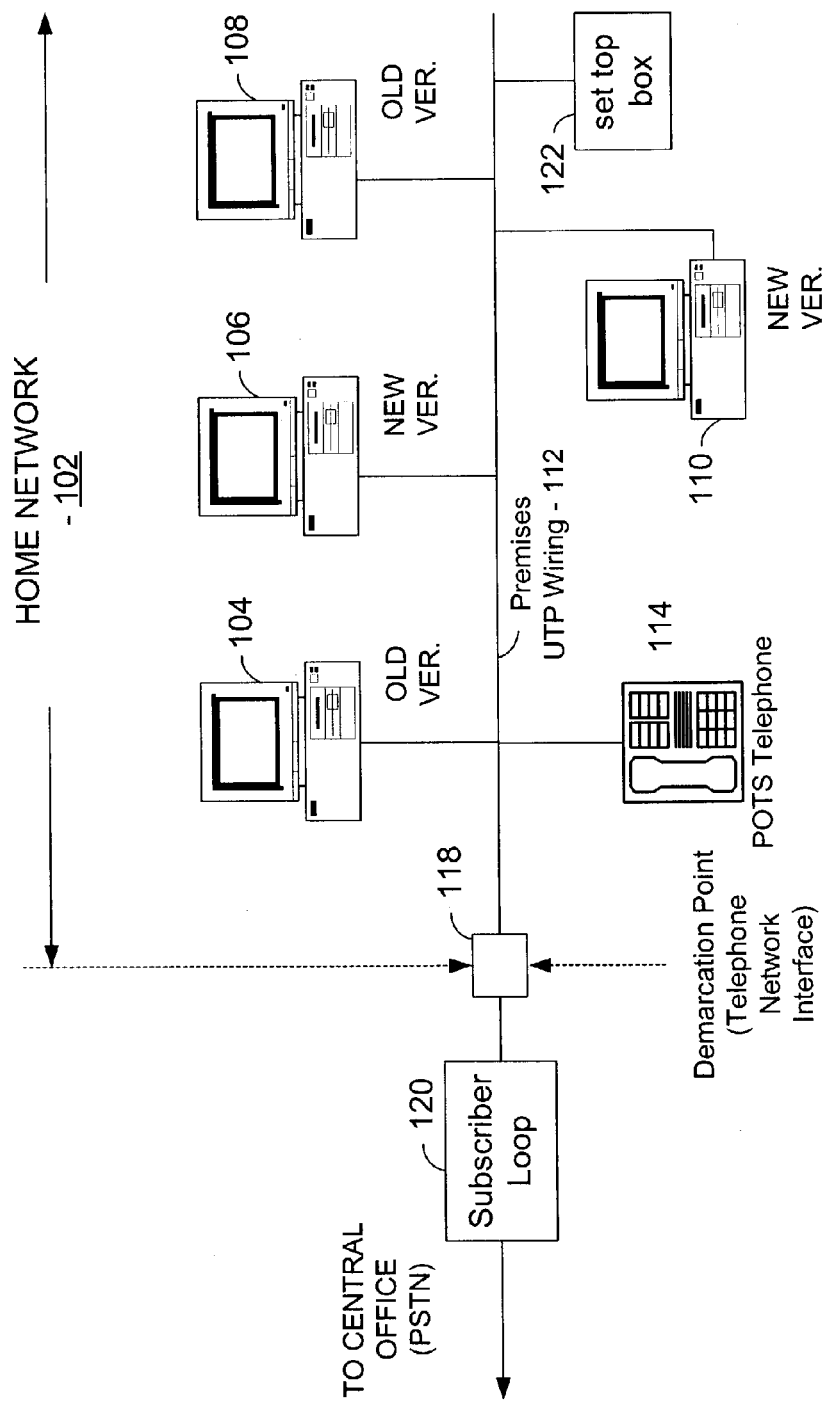
FIG. 1 is a system diagram illustrating a home data network that embodies the principles of the present invention.

FIG. 1 is a system diagram illustrating a home data network 102 that embodies the principles of the present invention. Home networking devices illustrated in FIG. 1 each support a single version of a plurality of versions of the HomePNA Specification. At the time of filing of this application, the HomePNA 2.0 Specification (Interface Specification for HomePNA 2.0.4 10M8 Technology (Version 0.8) date Jul. 17, 2001) was the most recent version of the HomePNA Specification. Computers 104 and 108 support an old version of the HomePNA standard, e.g., HomePNA 2.0, while computers 106 and 110 support a new version of the HomePNA Specification that may incorporate the teachings of the present invention, such new version designation not yet made. Hereinafter, references to an "old version" of the HomePNA Specification, "old version devices," or "old version operations" are generally made to devices and related operations that do not include the teachings of the present invention. Further, references to a "new version" of the HomePNA Specification, "new version devices," or "new version operations" are generally made to devices and related operations that include the teachings of the present invention. No other inferences or relationships regarding these references are to be drawn. These references are made merely to distinguish between those devices and operations that embody the teachings of the present invention and those devices and operations that do not.

Each of the computers 104-110 includes a network card and/or motherboard integrated circuits that support a respective version of the HomePNA Specification. Additionally, each of the computers 104-110 may also execute software instructions required for support of the respective a HomePNA Specification version. Operations according to the HomePNA 2.0 Specification are generally known and will only be described herein as they relate to the present invention.

The computers 104-110 communicate with one another via Unshielded Twisted Pair (UTP) wiring 112 located within a home network location 102. The UTP wiring 112 is generally referred to as "in-home telephone wiring." The UTP wiring 112 is shared with a Plain Old Telephone System (POTS) telephone 114 and a set top box 122. The UTP wiring 112 couples to the Public Switched Telephone Network (PSTN) via a PSTN subscriber loop 120. A demarcation point 118 interfaces the UTP wiring 112 to the subscriber loop 120. Via the UTP wiring 112 and the subscriber loop 120, the POTS telephone 114 and set top box 122 communicate with other devices across the PSTN. This construction and related operations are generally known and are not described further herein except as they relate to the present invention.

Table 1 describes some operational properties of old version operations and new version operations that may be implemented by computers 104 through 110 of FIG. 1. In Table 1, the old version is referred to as Home PNA 2.0 and the new versions are referred to as Mask 2 and Mask 3. Most description herein will relate particularly to Mask 2.

TABLE 1

NEW VERSION AND OLD VERSION PROPERTIES

|  | HomePNA 2.0 (old version) | Mask 2 (new version) | Mask 3 (new version) |
|---|---|---|---|
| Frequency Band | 4-10 MHz | 4-21 MHz | 4-28 MHz |
| Carrier Frequency | 7 MHz | 12 MHz | 18 MHz |
| Preamble/Header/Trailer symbol rate | 2 MHz | 2 MHz | 2 MHz |
| Payload Symbol Rate | 2, 4 MBaud | 2, 4, 8, 16 MBaud | 2, 6, 12, 24 MBaud |
| Constellation Sizes | 2-8 bits/symbol | 2-8 bits/symbol | 2-8 bits/symbol |

As is shown in Table 1, the old version employs a carrier frequency of 7 MHz and a frequency band of 4 MHz to 10 MHz. The Mask 2 new version employs a carrier frequency of 12 MHz and a frequency band of 4 MHz to 21 MHz. Finally, the Mask 3 new version employs a carrier frequency of 18 MHz and a frequency band of 4 MHz to 28 MHz. Thus, each of these versions has a different carrier frequency and frequency band. As is illustrated in Table 1, the maximum supported payload symbol rates of the versions varies. However, the constellation size (bits/symbol) remains consistent among the versions (2 to 8 bits/symbol). Further, the preamble/header/trailer symbol rate for each of the old and new versions is consistent (2 MHz). Commonality in frequency band, symbol rate, and constellation size between the old version operations and new version operations is employed with the present invention for inter-version compatibility operations.

Figure 2:
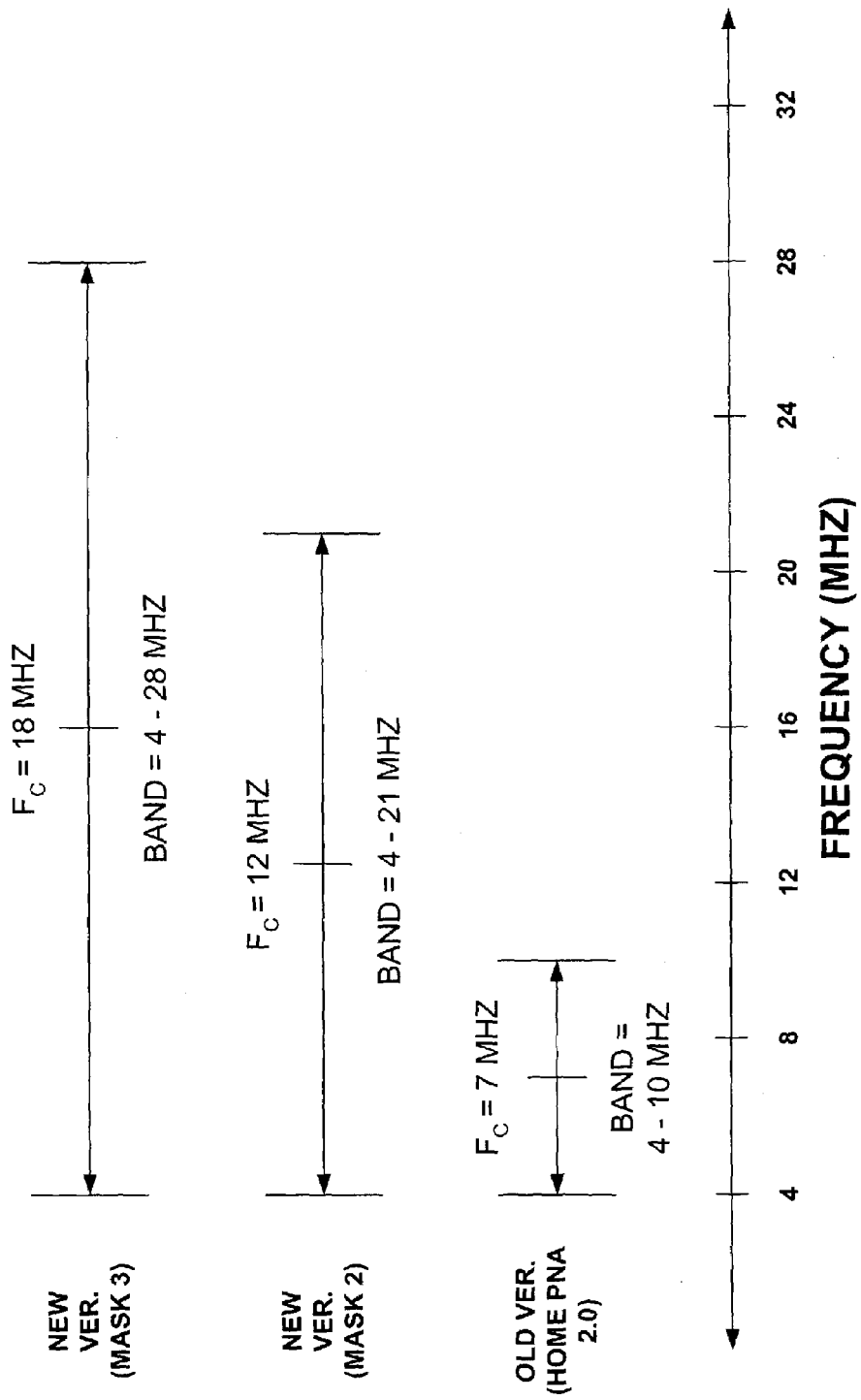
FIG. 2 is a graph illustrating the frequency bands and carrier frequencies defined for the old and new version operations of Table 1.

FIG. 2 is a graph illustrating the frequency bands and carrier frequencies defined for the old and new version operations of Table 1. With particular reference to old version operations, the HomePNA 2.0 Specification defines a signal format occupying the 4 MHz to 10 MHz frequency band, with a peak data rate of 32 Mbps. To modulate the signal, the HomePNA 2.0 Specification uses Quadrature Amplitude Modulation (QAM) and Frequency-Diverse Quadrature Amplitude Modulation (FDQAM). The modulation type is rate-adaptive with symbols rates of 2 MHz and 4 MHz, constellations sizes of 2 to 8 bits/symbol, and a carrier frequency of 7 MHz. The multiple stations share access to the medium using a type of Carrier-Sense Multiple Access (CSMA), where only one station may transmit at a time.

FDQAM is described in U.S. Regular application Ser. No. 09/971,407, filed Oct. 5, 2001 by Eric J. Ojard, in U.S. Regular application Ser. No. 09/169,522, filed Oct. 9, 1998 by Eric J. Ojard (both of which are incorporated herein in their entirety), and in Appendix C of the HomePNA 2.0.4 Specification. FDQAM is a modulation type wherein the spectral bandwidth of the signal is at least twice the symbol rate of a modulated signal such that multiple spectral copies of the modulated signal exist within the spectral bandwidth. As FDQAM is implemented in HomePNA 2.0.4, each spectral region of the baseband modulated signal is represented by at least two spectral regions of the modulated signal, improving robustness in the presence of highly frequency-selective channels. In HomePNA 2.0, FDQAM applies to the 2 MHz symbol rate but not the 4 MHz symbol rate. With the present invention, a technique similar to FDQAM is employed to form a backwards-compatible signal format.

Next-generation (new version) applications, such as streaming video, will require higher data rates, on the order of 100 Mbps and beyond. To achieve the highest possible data rates with the highest degree of reliability, the new version signal format, e.g., mask 2 and mask 3, will naturally occupy a larger bandwidth. To meet market requirements, new version HomePNA devices must coexist with HomePNA 2.0 stations on the same network. Thus, on a network with both HomePNA 2.0 stations and next-generation devices, either type of signal may be present on the network at different points in time. To simplify the development and to minimize the cost of the hardware for a next-generation station, it is highly desirable that the new version signal format be such that the same new version receiver hardware can process either new version signals or old version signals without prior knowledge of which type of signal is present. It is also desirable to use the same new version transmitter structure for either type of signal. Thus, according to the present invention, both HomePNA 2.0 receivers and new version HomePNA receivers may coexist on the same network.

Figure 3A:
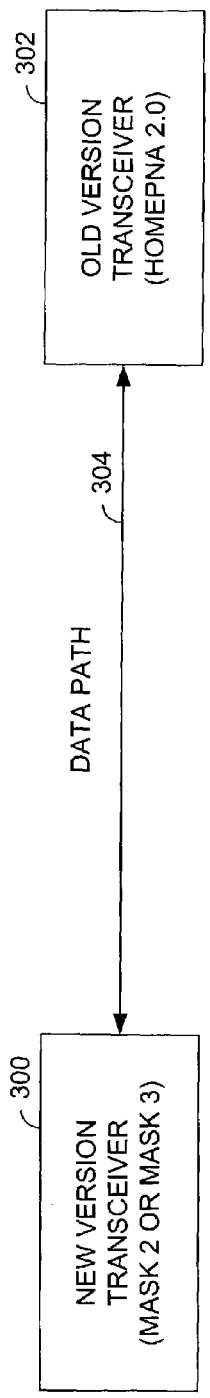
FIG. 3A is a block diagram illustrating generally how a new version device and an old version device interact according to the present invention.

FIG. 3A is a block diagram illustrating generally how a new version device and an old version device interact according to the present invention. As shown in FIG. 3A, an old version (HomePNA 2.0) transceiver 302 is able to communicate with a new version transceiver 300 (mask 2 or mask 3 of Table 1) via data path 304, e.g., the media 112 of FIG. 1. In particular, the new version device 300 transmits a new version signal that includes a component that appears, from the perspective of the old version device 302, to be an old version signal. The old version device 302 receives this component of the new version signal and, based upon information contained in a header portion of this component, determines whether it is the intended recipient for a respective payload of the corresponding data frame. If it is, the new version device 300 forms the payload so that the old version device 302 may receive it. In a transmission intended for a new version device, the new version device 300 forms the payload in a manner appropriate for receipt by another new version device. The old version device 302 simply ignores the payload.

Thus, in one operation, the old version device 302 receives the header, extracts data contained therein, determines that it is not the intended recipient, and ignores the corresponding payload (that is not compliant with the old version signal). In another operation, the new version device 300 sends a transmission intended for the old version device 302, indicating in the header that the transmission is intended for the old version device 302. In this operation, the old version device 302 receives the data contained in the payload. These operations will be described in detail with reference to FIGS. 4A-6C, 8, and 10A-12B.

For transmissions from the old version device 302 to the new version device 300, the old version device 302 transmits an old version signal. Using a same receiver structure that it uses for the receipt of both new version signals and old version signals, the new version device 300 receives the old version signal and extracts header information and payload contained in an old version signal data frame. With these receive operations, therefore, the old version signal also appears, from the perspective of the new version device to be a new version signal (at the corresponding symbol rate and constellation) transmitted over a channel that severely attenuates the higher frequencies. These operations will be described in detail with reference to FIGS. 7, 9, and 13A-14C.

Figure 3B:
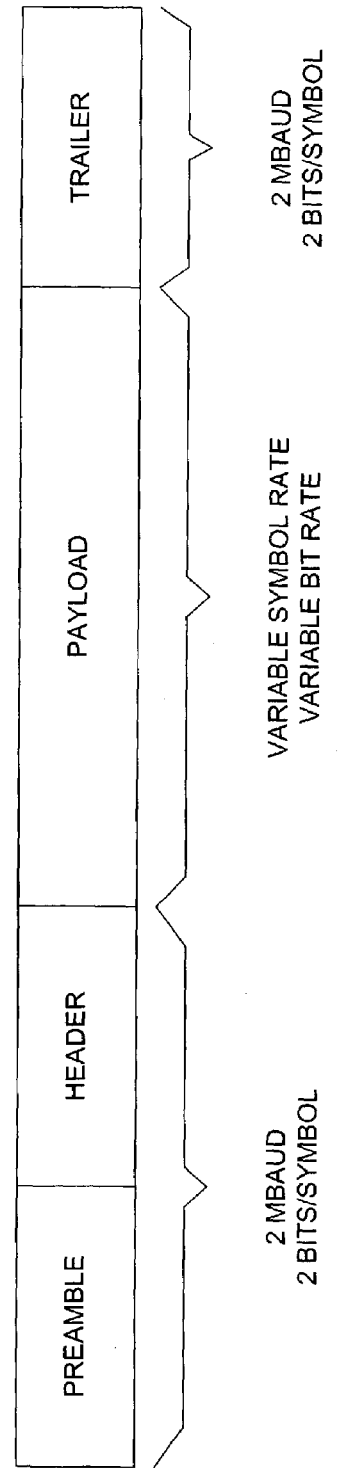
FIG. 3B is a block diagram illustrating the structure of a data frame constructed according to the present invention.

FIG. 3B is a block diagram illustrating the structure of a data frame constructed according to the present invention. As described in the HomePNA 2.0.4 specification, the data frame contains a preamble, a low-rate header, a variable high-rate payload, and a low-rate trailer, as shown in FIG. 3B. The preamble is a fixed sequence that provides for channel characterization, timing recovery, and equalizer training. The header indicates the modulation type of the payload, and it identifies the source and destination stations. The payload contains the data being transferred. The trailer provides a robust end-of-frame marker.

The duration of the data frames and the duration of each component of the data frames of the old version signal format and the new version signal format of FIG. 3B are consistent in some operations. From the perspective either of a new version device or of an old version device, the preamble, header, and trailer portions of the data frame of a new version signal and an old version signal are sufficiently similar to be sensed by new as well as old version devices, though they differ in frequency-dependent power spectral density and in phase. In some operations, the payload of a new version signal and an old version signal are also indistinguishable from the perspective either of a new version device or of an old version device.

Both the new version signal data frame and the old version signal data frame will include, a preamble, a header, and a trailer having one or more spectral copies of a baseband modulated signal with a 2 MBaud symbol rate and a 2 bits/symbol constellation. As will be recalled from Table 1, the baud rate and constellation of the HomePNA 2.0 Specification and the new version signal(s) are consistent.

However, the payload of a new version signal will be incompatible with old version devices in some operations. As was indicated in Table 1, the payload symbol rates supported by the HomePNA 2.0 Specification were 2 and 4 MBaud with constellations of between 2 and 8 bits/symbol. For Mask 2, the payload is transmitted at a symbol rate of between 2 and 16 MBaud with a constellation of between 2 and 8 bits/symbol. Finally, for Mask 3, the payload is transmitted at symbol rate of between 2 MBaud and 24 MBaud with a constellation of between 2 and 8 bits/symbol. Thus, the baud rates and constellation sizes of the preambles, headers, and trailers are consistent between the old version and new versions (from the perspective of each spectral copy of the baseband modulated signal). However, the payloads of the old version signal and new version signals are fully compatible for some symbol rates and constellation sizes but are incompatible for other symbol rates and constellation sizes.

Referring again to FIG. 3A, a new version device 300 includes a transmitter structure that produces a backwards-compatible new version signal that may be received by an old version device 302. The new version device 300 also includes a receiver structure that receives both new version signals and old version signals. According to the present invention, the new version device 300 operates within a new version frequency band, e.g., Mask 2 or Mask 3, while the old version device 302 operate within a old version frequency band, e.g., HomePNA 2.0 Specification.

To address the inherent incompatibility between the new version device 300 and the old version device 302, a new version signal includes a spectral component that appears, from the perspective of an old version device, to be an old version signal. Using this spectral component of the new version signal, a new version device 300 transmits control information and data to the old version device. According to one structure of the new version signal, the new version signal includes a plurality of identical spectral copies of a baseband modulated signal that reside within the new version frequency band. One (or multiple) of these spectral copies of the baseband modulated signal also resides within the old version frequency band and is/are indistinguishable from the old version signal. Moreover, a new version signal is characterized by a sloping power spectral density in a manner that provides sufficient power to enable an old version device to sense a new version signal and to successfully receive and interpret a new version signal header and preamble, as is described in greater detail below in the text for FIG. 19 and FIG. 20, among other places.

Likewise, the old version signal, when operated upon by a new version device 300, is indistinguishable from a new version signal (at corresponding symbol rates) with some spectral regions severely attenuated. Thus, the new version signal also supports the transmission of control information and data from old version devices to new version devices. According to one aspect of the present invention, the old version signal includes a spectral copy of a baseband modulated signal that resides within the old version frequency band. This spectral copy of the baseband modulated signal also resides within the new version frequency band and, when operated upon by the new version device, is indistinguishable from the new version signal. The old version signal may include multiple spectral copies of the baseband modulated signal within both the new and old version frequency bands. In such case, the new version device optimally combines these spectral copies of the baseband modulated signal.

In one embodiment of the new version signal, all preamble, header, and trailer portions of a new version signal include a component (one of a plurality of spectral copies of a baseband modulated signal) that is indistinguishable from an old version signal. When a new version device 300 transmits data to another new version device, the payload portion of the new version signal may be incompatible with the old version device. Based upon the contents of the header, however, an old version device 302 determines that the payload is not for it intended and ignores the payload.

The new version signal of the present invention may include a frequency-shifted portion and a non frequency-shifted portion. In such case, the frequency-shifted portion includes a plurality of spectral copies of a frequency shifted baseband modulated signal that are transmitted within the new version frequency band. One (or more) of these spectral copies of the baseband modulated signal is indistinguishable from an old version signal. Frequency shifting is performed so that at least one spectral copy of the baseband modulated signal is correctly formed within the old version frequency band so that it is indistinguishable from an old version signal. In this embodiment, absent the frequency shifting operations, the new version signal would be incompatible with old version devices. With this embodiment, non-payload portions of the new version signal, i.e., preamble, header and trailer, are shifted in frequency for all operations. However, payload portions of the new version signal are frequency shifted only when intended for old version devices (or when transmitting at a symbol rate consistent with old version devices).

With one particular embodiment described with reference to FIGS. 5A and 6A-6C, a one MHz frequency shift is required. With the baseband modulated signal having a baud rate of 2 MHz, inversion of every other symbol of the appropriate portions of the baseband modulated signal frequency shifts those portions of the baseband modulated signal by 1 MHz in frequency. After up sampling, modulation, and transmit filtering at the new version carrier frequency (12 MHz), a spectral copy of a baseband modulated signal carrying the preamble, header, and trailer portions of the data frame (of FIG. 3B) is created at the carrier frequency of the old version device 302. In a non-carrier based modulation scheme, the spectral copy of the baseband modulated signal is produced within the appropriate frequency band and at a desired center frequency. This spectral copy of the baseband modulated signal carrying the preamble, header, and trailer portions of the data frame at the carrier frequency of the old version device is indistinguishable from an old version signal.

Figure 5A:
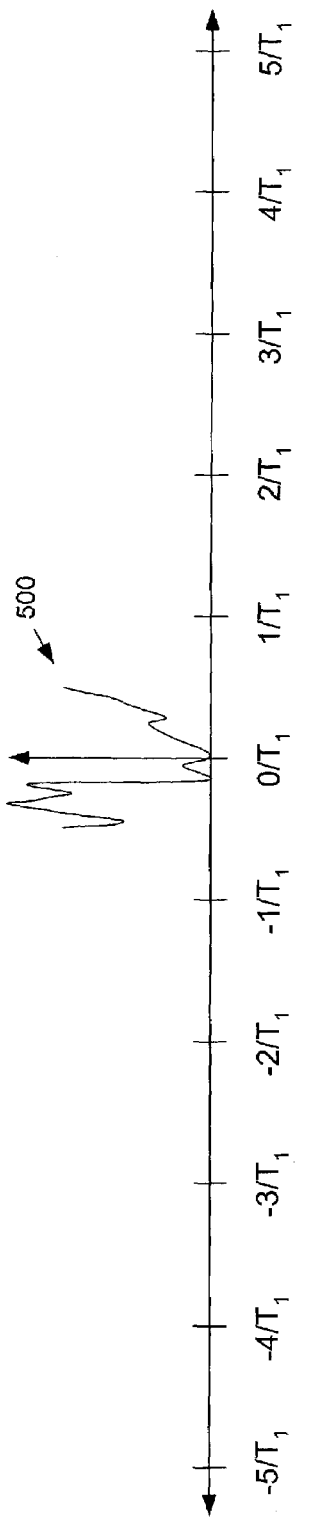
FIG. 5A is a graph illustrating the power spectral density of a baseband modulated signal carrying a preamble and header that is formed according to the present invention.

FIG. 4A is a block diagram generally illustrating the components of a carrier-based transmitter that operates according to the present invention. In this structure, data bits are received by one or more operations 402 that perform data framing, coding, and other preprocessing operations. After these operations 402, data bits are output that are framed, encoded, and otherwise processed for transmission. These encoded and framed data bits are received by a baseband encoder 404, which encodes the data bits into a baseband modulated signal. The power spectral density of a baseband modulated signal carrying the preamble and header is illustrated in FIG. 5A. An up sampling low pass filter 406 up samples and low pass filters the baseband modulated signal. Resultantly, a signal is produced that includes a plurality of spectral copies of the baseband modulated signal. Each spectral copy of the baseband modulated signal resides within a respective frequency band and at a respective center frequency. A carrier modulation block/transmit filtering block 408 receives the plurality of spectral copies of the baseband modulated signal and modulates them onto a carrier to create a real signal that is coupled to a media, e.g., UTP wiring 112 of FIG. 1.

The baseband modulated signal produced by the baseband modulator 404 may also be frequency shifted by the baseband modulator 404. The baseband modulated signal is frequency shifted in some operations so that a spectral copy of the baseband modulated signal will exist within a desired frequency band and with an appropriate center frequency so that it corresponds to an old version device. During formation of the payload, frequency shifting may or may not occur, based upon the characteristics of an intended device, i.e., a new version device or an old version device.

FIG. 4B is a block diagram illustrating in more detail the components of a carrier-based transmitter operating according to the present invention with particular applicability to a home networking installation. Data bits in an Ethernet frame are received by framing block 452. Framing block 452 performs framing operations on the data bits (here, of the Ethernet frame) and then provides its output to a scrambling block 454. The scrambling block 454 scrambles the frame that is received from framing block 452 and passes the scrambled frame as data bits to constellation encoder 456. The constellation encoder 456 creates the baseband modulated signal and frequency shifts the baseband modulated signal in some operations.

In one particular operation according to the present invention, the constellation encoder 456 frequency shifts portions of the baseband modulated signal corresponding to the preamble, header, and trailer of the data frame to create a frequency shifted baseband modulated signal. In one embodiment of these frequency-shifting operations, the constellation encoder 456 inverts every other symbol of the portions of the baseband modulated signal corresponding to the preamble, the header and the trailer. With a baseband modulated signal formed at 2 MBaud, by inverting every other symbol of these portions of the baseband modulated signal, the modified baseband modulated signal is shifted 1 MHz in frequency. The baseband modulated signal is received by up sampling low-pass filter 458 that up samples the baseband modulated signal and low pass filters the resultant signal. The resultant signal that includes a plurality of spectral copies of the baseband modulated signal.

FIG. 4B and all subsequent FIGs. are described with particular reference to the Mask 2 example of Table 1. The reader will appreciate that the Mask 3 example of Table 1 could easily be applied by considering the differing characteristics of Mask 3 operations. The output of the up sampling low-pass filter 458 includes both real and imaginary components, e.g., I and Q components. These components are passed to an up-conversion block including a real part processing block 460 and an imaginary part processing block 462. The outputs of blocks 460 and 462 are modulated with corresponding I and Q components of the 12 MHz carrier. The I and Q carrier modulated components are summed and then transmit filtered at transmit filter block 464 to produce a new version signal for transmission. The new version signal is then coupled to a service media, e.g., UTP wiring 112 of FIG. 1.

Figure 19:
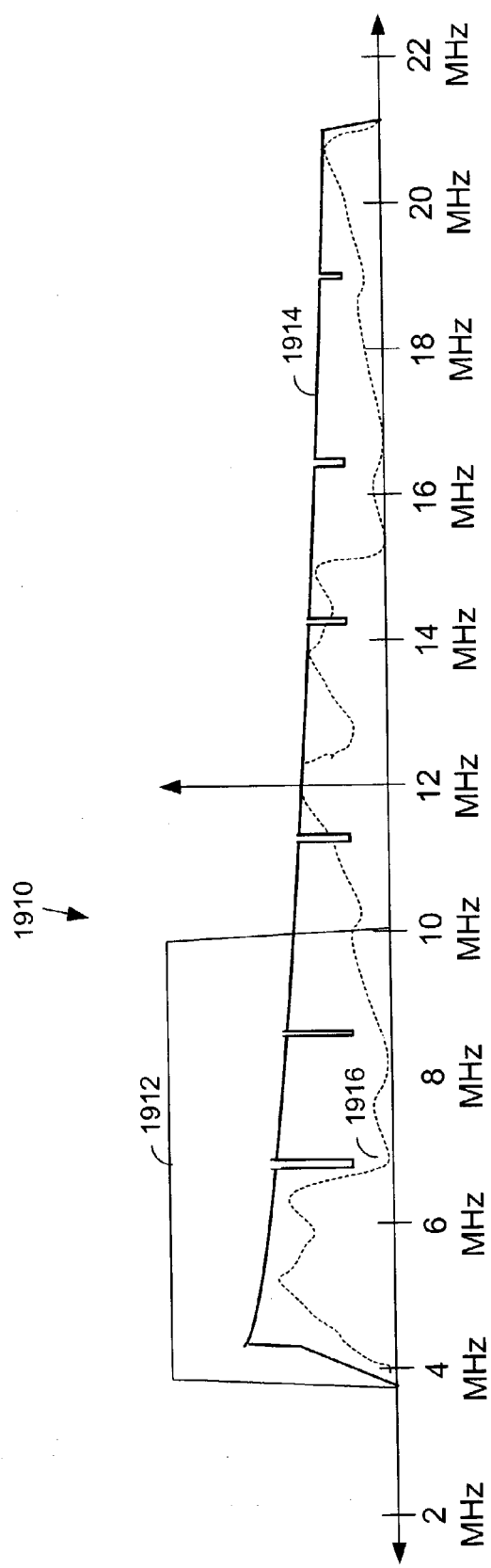
FIG. 19 is a graph illustrating a power spectral density for a new version signal transmitted in one of a plurality of new version signal frequency bands.

FIG. 5A is a graph illustrating the power spectral density of a baseband modulated signal carrying a preamble and header that is formed according to the present invention. The particular power spectral density of FIG. 5C is one that does not slope. Accordingly, for a system according to FIG. 5C, the total output power exceeds a total output power level for an old version signal or device. For systems in which a total output power level is to be maintained, a sloping power spectral density, as shown in FIG. 19 and as described herein, is utilized in one embodiment of the invention. The baseband modulated signal of FIG. 5A has a symbol rate of 2 MHz and a constellation that corresponds to the HomePNA 2.0 Specification. Thus, the power spectral density of the preamble and header portion of the baseband modulated signal has a 2 MHz bandwidth that corresponds to a 2 MBaud symbol rate. The power spectral density of the baseband modulated signal will vary from data frame to data frame based upon the contents of the header. However, the bandwidth of the baseband modulated preamble, header, and trailer portions of the baseband modulated signal will be 2 MHz for all 2 MBaud preambles/headers. A payload portion of the data frame will have similar characteristics when encoded at a symbol rate of 2 MBaud but will occupy a wider band when encoded at higher symbol rates. The description of FIGS. 5A through 6C will consider the power spectral density of the preamble and header portions of a corresponding data frame. However, this discussion applies to the trailer portion of the data frame as well and to the payload of the data frame when using a 2 MBaud symbol rate.

Figure 5B:
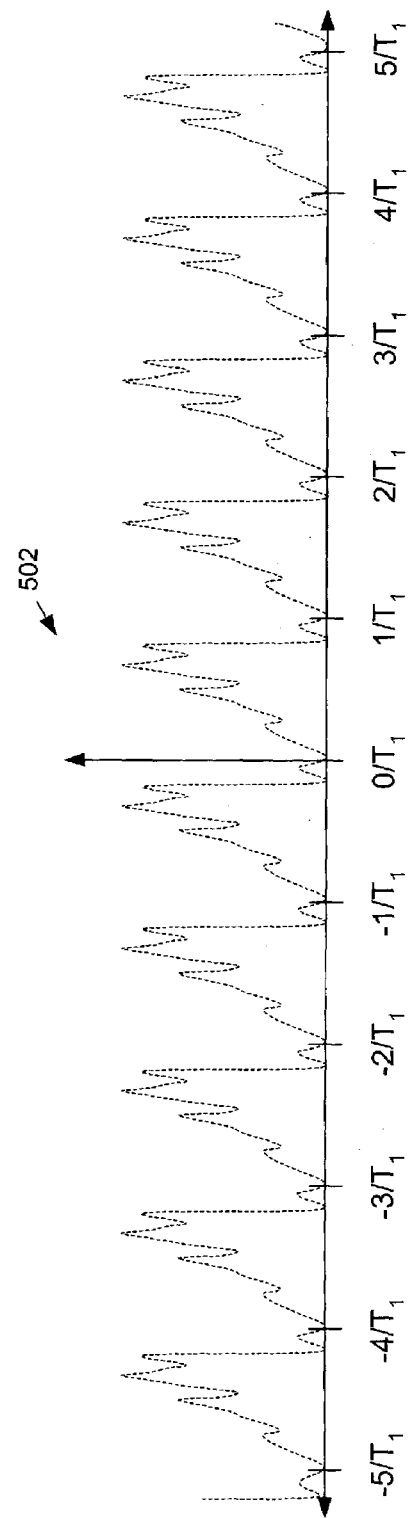
FIG. 5B is a graph illustrating the power spectral density of a plurality of spectral copies of the signal of FIG. 5A.

FIG. 5B is a graph illustrating the power spectral density of a plurality of spectral copies of the signal of FIG. 5A. The power spectral density 502 of FIG. 5B includes a plurality of spectral copies of the baseband modulated signal of FIG. 5A located adjacent one another and spread across the frequency spectrum. These spectral copies are aliases of the baseband modulated signal that are caused by the up sampling operations previously described. Each of these spectral copies of the baseband modulated signal has a bandwidth corresponding to the baseband modulated signal of FIG. 5A and has a respective center frequency.

FIG. 5C is a graph illustrating the power spectral density 506 of the signal of FIG. 5B after modulation with a 12 MHz new version device carrier and that is overlaid with a transmit filter 508 corresponding to the new version device. The signal of FIG. 5B corresponds to the Mask 2 (new version signal) format with which the carrier frequency is 12 MHz and the frequency band is 4-21 MHz. The power spectral density 506 shown in FIG. 5C includes a plurality of spectral copies of the baseband modulated signal that have been modulated by the 12 MHz carrier and then transmit filtered. Thus, the power spectral density 506 appears similar to the power spectral density 502 of FIG. 5B but is centered about the carrier of 12 MHz and filtered with a transmit filter having at a frequency band of 4-21 MHz.

As is shown, the new version signal includes a plurality of spectral copies of the baseband modulated signal, each of these spectral copies of the baseband modulated signal having a 2 MBaud symbol rate. However, the signal of FIG. 5C has not been frequency shifting according to the present invention. The old version device of Table 1 operates within a frequency band of 4-10 MHz and has a carrier frequency of 7 MHz. While the signal of FIG. 5C includes a spectral copy of the baseband modulated signal at 6 MHz and 8 MHz within the frequency band of 4-10 MHz, it has no spectral copy at the 7 MHz carrier of the old version device of Table 1. Thus, this new version signal is incompatible with the old version device of Table 1.

FIG. 6A is a graph illustrating the power spectral density of a plurality of spectral copies of a frequency shifted baseband modulated signal carrying a preamble and header that is formed according to the present invention. In forming the signal of FIG. 6A, a baseband modulated signal was shifted in frequency by 1 MHz prior to up sampling low-pass filtering. As compared to the power spectral density 502 of FIG. 5B, the power spectral density 602 of FIG. 6A includes a plurality of spectral copies of the baseband modulated signal, each of which is shifted by 1 MHz in frequency from a corresponding spectral copy of the signal of FIG. 5B. As was previously described, one technique that may be applied to achieve this frequency shift is to invert every other symbol of the baseband modulated signal.

Figure 6B:
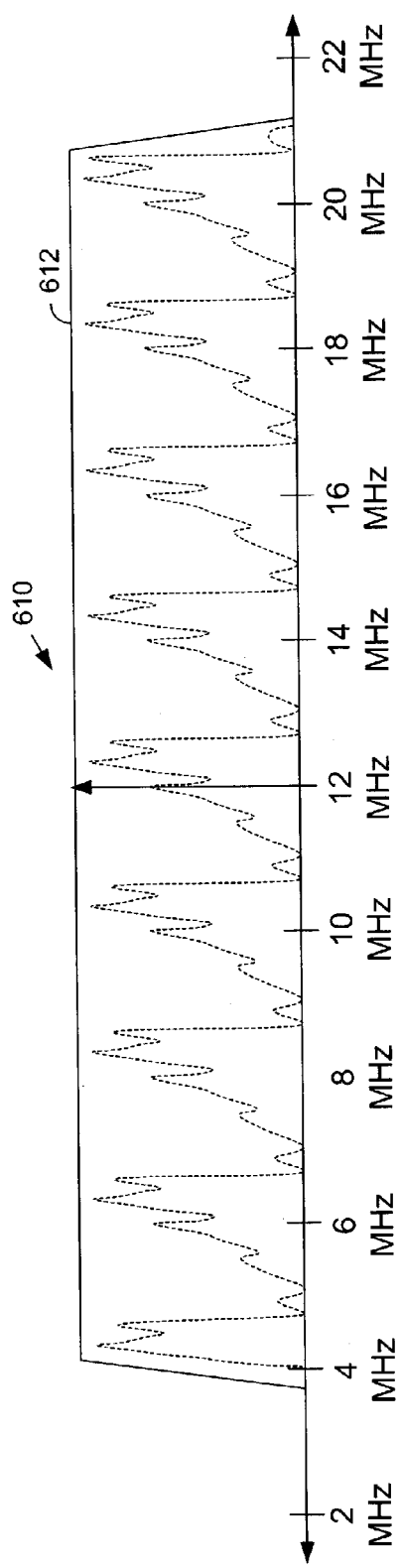
FIG. 6B is a graph illustrating the power spectral density of the signal of FIG. 6A after modulation with a new version device carrier of 12 MHz and transmit filtering according to the present invention.

FIG. 6B is a graph illustrating the power spectral density 610 of the signal of FIG. 6A after modulation with a new version device carrier of 12 MHz and transmit filtering according to the present invention. The signal of FIG. 6B has a bandwidth corresponding to the new device transmit filter 612 band of 4-21 MHz. As contrasted to the signal of FIG. 5C, the signal of FIG. 6B includes a plurality of spectral copies of the baseband modulated signal that are shifted by 1 MHz in frequency even though the signal occupies the same 4-21 MHz frequency band.

Figure 6C:
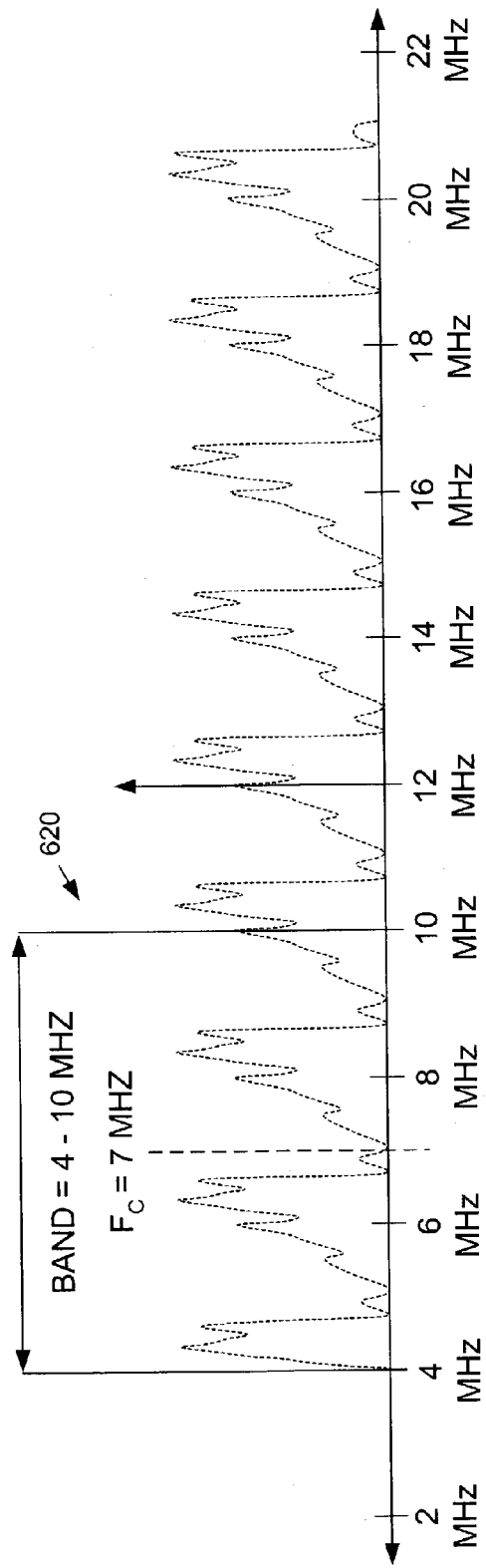
FIG. 6C is a graph illustrating the power spectral density of the signal of FIG. 6B that is also overlaid with a 7 MHz carrier and 4-10 MHz frequency band of an old version device.

FIG. 6C is a graph illustrating the power spectral density of the signal of FIG. 6B that is also overlaid with a 7 MHz carrier and 4-10 MHz frequency band of an old version device. The carrier frequency and the frequency band 620 of the HomePNA 2.0 Specification is illustrated along with the power spectral density 610 of FIG. 6B. As is shown, a spectral copy of the baseband modulated signal resides at the old version carrier frequency of 7 MHz (second carrier frequency) and resides within the old version frequency band of 4-10 MHz (old version frequency band). This spectral copy of the baseband modulated signal is indistinguishable from an old version signal. Thus, the new version device producing the new version signal of FIG. 6B/6C is fully compatible with old version devices.

The preamble, header, and trailer portions of the new version signal may be formed so that they are at all times compatible with old version devices. Further, the payload of the new version signal is formed to be compatible with old version devices when transmitting data to an old version device. In such case, the power spectral density of the payload of a corresponding data frame will appear similar to the power spectral density 610 of FIGS. 6B and 6C. In other operations, a new version device could use this same signal construct to transfer a payload to another new version device. During most operations, however, when transmitting a payload to another new version device, a wider bandwidth signal format would be employed to achieve a higher data rate.

Figure 7:
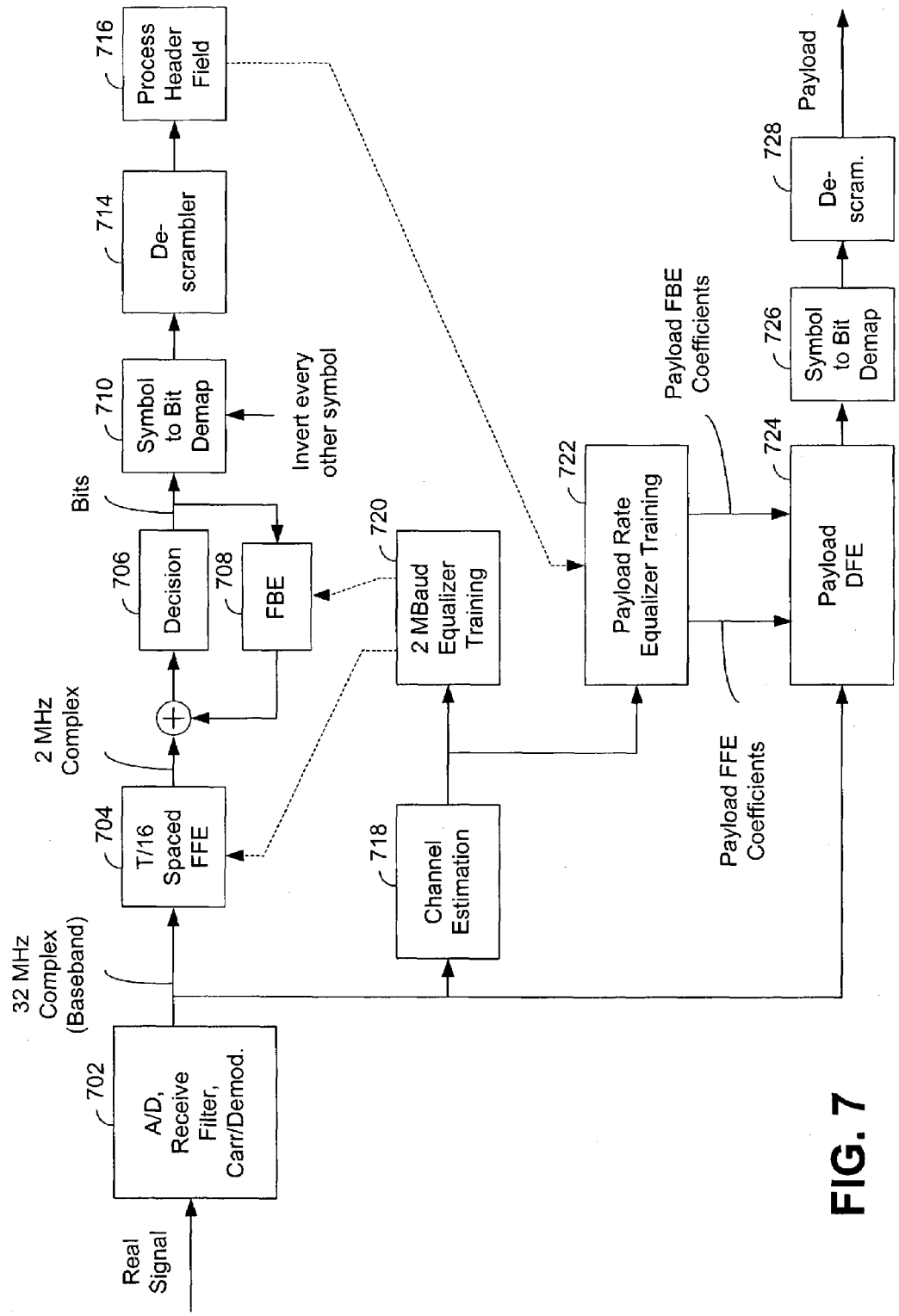
FIG. 7 is a block diagram illustrating components of a new version receiver section constructed according to the present invention.

FIG. 7 is a block diagram illustrating components of a new version receiver section constructed according to the present invention. The components of FIG. 7 may be contained in a home networking device such as the new version computers 106 and 110 of FIG. 1. The components of FIG. 7 may be implemented in dedicated hardware contained on an integrated circuit. Alternately, the components illustrated in FIG. 7 may be implemented within a digital signal processor contained in a device that supports home networking operations. Moreover, the components of FIG. 7 may be implemented as a combination of dedicated hardware components and a digital signal processor. Further, the components of FIG. 7 may be partially implemented in a host processor or other type of processor contained on a serviced device. Thus, the components of FIG. 7 are illustrated only to describe how the present invention may be functionally implemented in a new version device. As should be understood, these components may be employed in a home networking environment or in another networking environment in which interoperability between versions is performed.

In the receiver of FIG. 7, a real signal is received that is coupled to the device on a media such as the premises UTP wiring 112 of FIG. 1. This real signal may be amplified or attenuated prior to its receipt by an analog to digital converter, receiver filter, and carrier demodulation block 702. As is generally known, conversion from the analog domain to the digital domain is performed by an analog to digital converter (ADC) of block 702. Receive filtering and carrier demodulation from a carrier frequency, e.g., 12 MHz to baseband is also performed by block 702. In the particular embodiment of FIG. 7, ADC sampling is performed such that a 32 MHz complex baseband modulated signal is produced. This 32 MHz bandwidth is sufficient to sample the 4-21 MHz band of the Mask 2 device of Table 1. Thus, for a 2 MBaud preamble, header, and header, the 32 MHz sampling rate corresponds to a T/16 fractional sampling ratio.

The receiver structure of FIG. 7 includes a first signal path for 2 MBaud symbol rates and another signal path for other symbol rates. Referring again to Table 1, the preamble, header, and trailer portions of both the new version signal and the old version signal have a 2 MBaud symbol rate. Thus, the 2 MBaud signal path processes the preamble, header, and trailer of each data frame. Further, the 2 MBaud signal path processes payloads that have a 2 MBaud symbol rate, e.g., old version signals received by a new version device.

For all operations, the output of the ADC, receive filter, and carrier demodulation block 702 is received by a channel estimation block 718. The channel estimation block 718 produces a channel estimate based upon a preamble contained in a data frame of the received signal. This channel estimate is used by a 2 MBaud equalizer training block 720 to produce coefficients for a feed forward equalizer (FFE) 704 and a feedback equalizer (FBE) 708 of the 2 MBaud signal path. Together, the FFE 704 and the FBE 708 make up a Decision Feed Back Equalizer (DFE) that services the 2 MBaud signal path. The channel estimate is also used by a payload rate equalizer-training block 722 to produce payload FFE coefficients and payload FBE coefficients for use by a payload DFE 724 (that include an FFE and a FBE).

With the FFE and FBE coefficients determined, the FFE 704 operates on the header of the data frame. The FFE 704 is a T/16 Spaced FFE that equalizes and optimally combines a plurality of spectral copies of a baseband modulated signal present within the bandwidth of the receive filter of block 702 (4-21 MHz). The output of the FFE 704 is received by summing block, which also receives the output of the FBE 708. The output of the summing block is received by decision block 706, which maps the baseband symbol to a corresponding constellation point. The output of decision block 706 is received by a symbol-to-bit demapper 710 that receives the constellation mapping output of decision block 706 and converts the constellation mapping to data bits. The output of the symbol-to-bit demapper 710 is received by descrambler 714, which performs descrambling operations. The output of the descrambler 714 is received by the process header field block 716 that determines at what baud rate and constellation size the payload portion of the corresponding data frame will be contained. This information is passed to the payload rate equalizer training block 722 and to a payload DFE 724.

Based upon the payload information extracted from the header, the payload rate equalizer training block 722 produces the payload FFE and the payload FBE coefficients that are employed by the payload DFE 724 to map symbols of the payload to constellation points. A payload symbol-to-bit demapper 726 receives the output of the payload DFE 724 and produces a scrambled bit stream. A payload descrambler 728 receives the output of the payload symbol-to-bit demapper 726 and produces the payload for the data frame.

According to the present invention, the symbol-to-bit demapper 710 inverts every other symbol of the received 2 MBaud baseband modulated signal to compensate for the 1 MHz frequency shift present in the signal. Further, for a payload transmitted by an old version device and received by the new version device of FIG. 7 (or for a frequency shifted payload at 2 MBaud transmitted by a new version device), such symbol inversion is also required.

FIG. 8 is a logic diagram illustrating transmit operations according to the present invention. In a transmit operation, the new version transmitter first determines a payload Baud rate and constellation size (step 802). As was described in detail with reference to FIG. 3B, the data frame format for a home networking environment includes a preamble, a header, a payload and a trailer. The header includes information to indicate respective payload Baud rate and constellation size. Thus, in creating the preamble and header at step 804, the header is created to include such information.

Once the preamble and header have been created for the particular data frame, the preamble and header are baseband modulated (step 806). Next, the baseband modulated preamble and header are frequency shifted (when required) according to the present invention (optional step 808). Then, the baseband modulated signal is up sampled, carrier modulated, transmit filtered, and transmitted on a physical media for receipt by another home networking device (step 810). In an alternate operation of step 810, a carrier-less modulation type, e.g., Carrier-less Amplitude and Phase (CAP) Modulation, is employed. Carrier-less operations will be described with reference to FIGS. 10A-12B. Next, the payload is baseband modulated (step 812), up sampled, carrier modulated, transmit filtered, and transmitted (step 814). Subsequent to these operations, the trailer is also baseband modulated, frequency shifted, up sampled, carrier modulated, transmit filtered, and transmitted on the media. The operations of FIG. 8 are then repeated for each subsequent data frame.

FIG. 9 is a logic diagram illustrating receive operations according to the present invention. The operations of FIG. 9 are performed by a new version receiver to operate upon a received physical layer data frame, either an old version signal or a new version signal. A receiver that operates according to FIG. 9 was illustrated in, and described with reference to FIG. 7. In a first operation, the receiver receives preamble and header symbols that have been ADC sampled, receive filtered, carrier demodulated, and optimally combined (step 902). A 2 MBaud equalizer training block then generates DFE coefficients for a 2 MBaud DFE and the 2 MBaud DFE equalizes the header (step 904). The header symbols are then operated upon by the DFE and mapped to a constellation. Then, when required to remove the frequency shifting modifications that have been made according to the present invention, every other symbol of the header is inverted (optional step 906).

Data is then extracted from the header that indicates the payload Baud rate and the constellation of the payload (step 908). Based upon the header information and a channel estimate determined from the preamble of the data frame, a payload DFE is trained (step 910), the payload is equalized, and data is extracted from the payload (step 912). When the payload corresponds to the data rate of the preamble and header, 2 MBaud, the 2 MBaud DFE is employed to operate upon the payload. Such is the case, in one example, when the data frame is transmitted from an old version device to the new version device.

FIG. 10A is a block diagram generally illustrating the components of a carrier-less transmitter that operates according to the present invention. In this structure, data bits are received by one or more operations 1002 that perform data framing, coding, and other preprocessing operations. After these operations 1002, data bits are output that are framed, encoded, and otherwise processed for transmission. These encoded and framed data bits are received by a baseband modulator 1004, which encodes the data bits into a baseband modulated signal. The power spectral density of a preamble and header portion of this baseband modulated signal is illustrated in FIG. 5A. An up sampling transmit filter 1006 up samples the baseband modulated signal and transmit filters the up sampled signal to create a signal that includes a plurality of spectral copies of the baseband modulated signal. Each of these spectral copies of the baseband modulated signal resides within a respective frequency band. This signal is then transmitted on a coupled media. In one embodiment of the structure of FIG. 10A, the structure produces a CAP modulated signal.

The baseband modulated signal produced by the baseband modulator 1004 may also be frequency shifted by the baseband modulator 1004. As was previously described, portions of the baseband modulated signal corresponding to the preamble, header, and trailer are frequency shifted in one operation in order for a spectral copy of the baseband modulated signal to exist within an appropriate frequency band that corresponds to the old version device. During formation of the payload, frequency shifting may or may not occur, based upon the characteristics of an intended device, i.e., old version device or new version device.

FIG. 10B is a block diagram illustrating in more detail the components of a carrier-less transmitter operating according to the present invention with particular applicability to a home networking installation. Data bits in an Ethernet frame are received by framing block 1052. Framing block 1052 performs framing operations on the Ethernet frame and then provides its output to a scrambling block 1054. The scrambling block scrambles the frame that is received from block 1052 and passes its scrambled frame as data bits to constellation encoder 1056. The constellation 1056 encoder creates the baseband modulated signal and frequency shifts the baseband modulated signal in some operations.

In one particular operation according to the present invention, the constellation encoder 1056 frequency shifts portions of the baseband modulated signal corresponding to the preamble, header, and trailer of a data frame. In one embodiment of these frequency-shifting operations, the constellation encoder 1056 inverts every other symbol of the portions of the baseband modulated signal corresponding to the preamble, the header and the trailer. With a baseband modulated signal formed at 2 MBaud, by inverting every other symbol of these portions of the baseband modulated signal, the baseband modulated signal is shifted 1 MHz in frequency.

The baseband modulated signal is received by both a real signal component block 1058 and an imaginary signal component block 1060. The output of the real signal component block 1058 is up sampled and transmit filtered by the real component of the transmit filter 1062. Likewise, output of the imaginary signal component block 1060 is up sampled and transmit filtered by the imaginary component of the transmit filter 1064. The up sampled and transmit filtered real and imaginary components produced by blocks 1062 and 1064, respectively, are then combined and transmitted on a coupled media. Each of the transmit filters 1006, 1062 and 1064 produce a negatively sloping PSD in one embodiment of the invention.

Figure 11A:
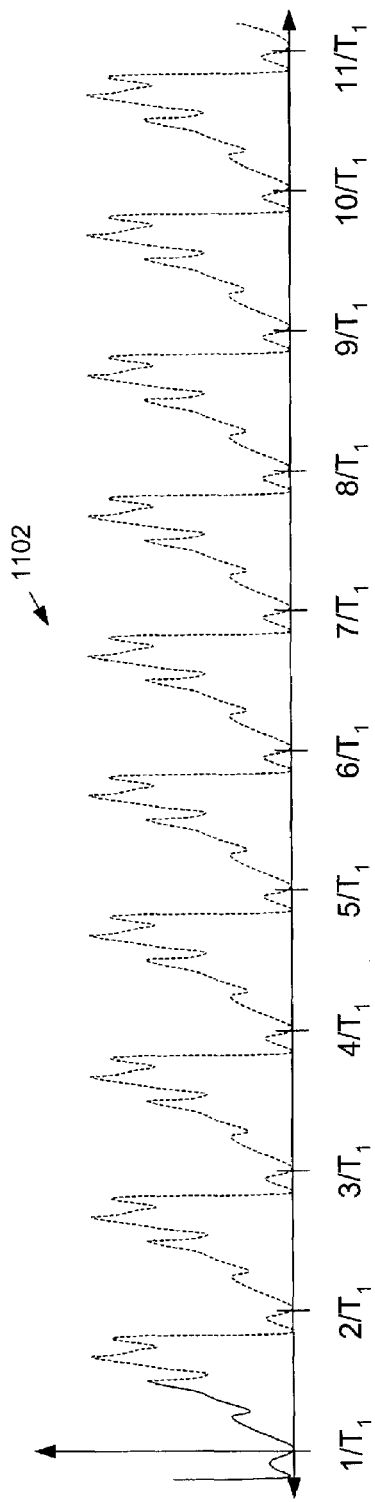
FIG. 11A is a graph illustrating the power spectral density of a plurality of spectral copies of a baseband modulated signal formed according to the present invention.

FIG. 11A is a graph illustrating the power spectral density of a plurality of spectral copies of a baseband modulated signal formed according to the present invention. Each spectral copy of the baseband modulated signal has a symbol rate of 2 MBaud, has the spectral characteristics of the baseband modulated signal of FIG. 5A, and resides within a respective frequency band. Each of these spectral copies of the baseband modulated signal has a 2 MHz bandwidth. The spectral copies of the baseband modulated signal are spaced at 2 MHz intervals.

Figure 11B:
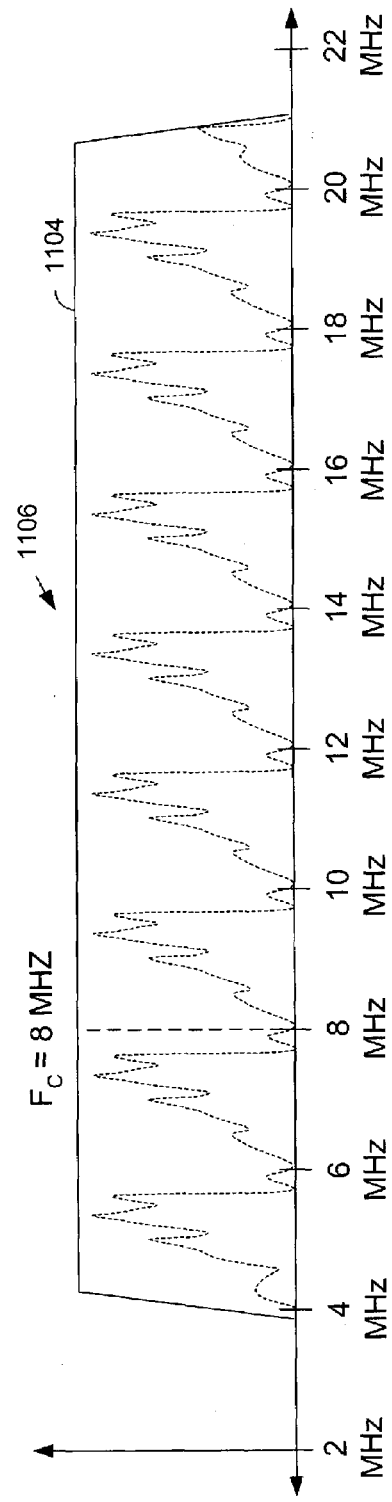
FIG. 11B is a graph illustrating the power spectral density of the signal of FIG. 11A after the signal has been transmit filtered.

FIG. 11B is a graph illustrating the power spectral density of the signal of FIG. 11A after the signal has been transmit filtered. The signal 1106 of FIG. 11B corresponds to the Mask 2 (new version signal) format where the transmit filter 1104 has a frequency band of 4-21 MHz. The signal 1106 of FIG. 11B includes a plurality of spectral copies of the baseband modulated signal, each of which has a 2 MBaud symbol rate. Each of these spectral copies of the baseband modulated signal carries the preamble and header of a corresponding data frame. The signal 1106 of FIG. 11B is indistinguishable from the signal 506 of FIG. 5C. As was the case with the signal 506 of FIG. 5C, the power spectral density of the signal of FIG. 11B does not include frequency shifting according to the present invention. As was also the case with the signal 506 of FIG. 5C, the signal 1106 includes a spectral copy of the baseband modulated signal centered at 8 MHz but does not include a spectral copy of the baseband modulated signal centered at 7 MHz. Thus, the new version signal 1106 of FIG. 11B is incompatible with the with old version device of Table 1.

Figure 12A:
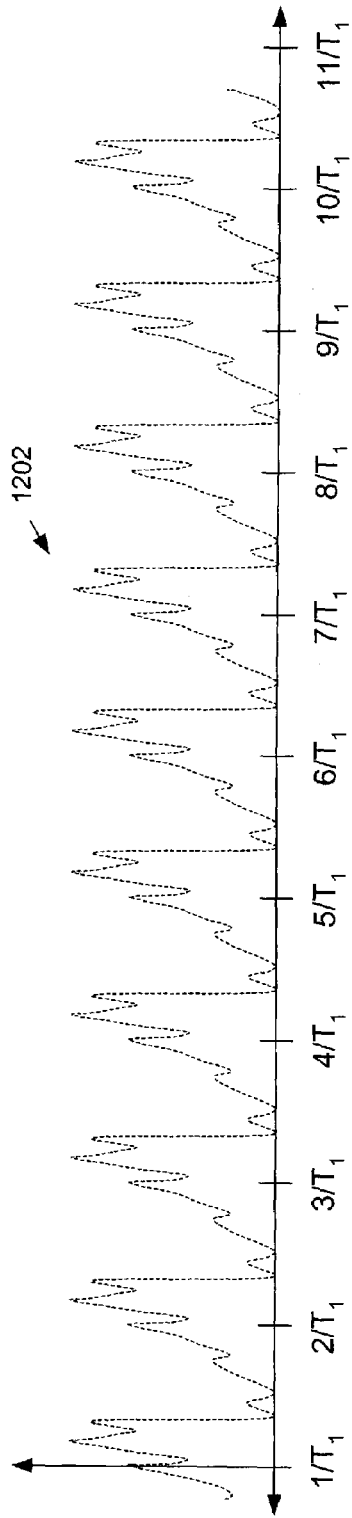
FIG. 12A is a graph illustrating the power spectral density of a plurality of spectral copies of a frequency shifted baseband modulated signal formed according to the present invention.

FIG. 12A is a graph illustrating a plurality of spectral copies of a frequency shifted baseband modulated signal formed according to the present invention. With the signal 1202 of FIG. 12A, the baseband modulated signal was shifted in frequency by 1 MHz prior to up sampling. Thus, the signal 1202 of FIG. 12A is indistinguishable from the signal 610 of FIG. 6B. As compared to the signal 1102 of FIG. 11A, the signal 1202 of FIG. 12A has the same signal shape but with a 1 MHz frequency shift. As was previously described, one technique for achieving this frequency shift is to invert every other symbol of the baseband modulated signal corresponding to the preamble and header portions of the data frame.

Figure 12B:
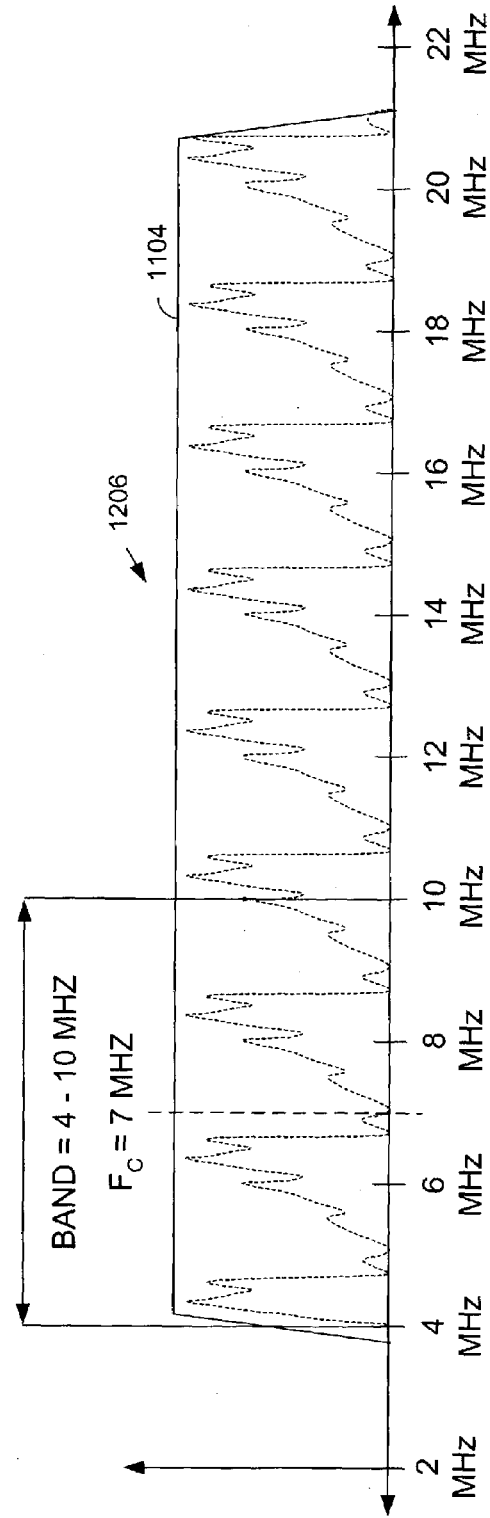
FIG. 12B is a graph illustrating the power spectral density of the signal of FIG. 12A after transmit filtering and that is overlaid with a 7 MHz carrier and 4-10 MHz frequency band of an old version device.

FIG. 12B is a graph illustrating the power spectral density of the signal of FIG. 12A after transmit filtering and that is overlaid with a 7 MHz carrier and 4-10 MHz frequency band of an old version device. As is shown, a spectral copy of the baseband modulated signal corresponding to the preamble and header resides at the old version carrier frequency of 7 MHz (second carrier frequency) and resides within the old version frequency band of 4-10 MHz (old version frequency band). This spectral copy of the baseband modulated signal is indistinguishable from an old version signal. Because this spectral copy of the baseband modulated signal carries the preamble and header portions of a data frame, the old version device receiving the new version signal may extract the information contained therein and operate accordingly. As may be seen, the embodiment of FIG. 12B does not illustrate a sloping power spectral density.

FIG. 13A is a graph illustrating the power spectral density of an old version signal that is modulated with a 7 MHz carrier and transmit filtered with an old version device transmit filter. The signal 1302 of FIG. 13A includes a complete spectral component of the baseband modulated signal centered at 7 MHz and partial spectral copies of the baseband modulated signal at 5 MHz and 9 MHz. These spectral components were produced by the old version device with a transmit filter that extends from 4 MHz to 10 MHz.

FIG. 13B is a graph illustrating the power spectral density of the old version signal of FIG. 13A overlaid with a receive filter of a new version device. As is shown, a receive filter 1308 of a new version device has a band extending from 4-21 MHz. Thus, with the receive filter 1308 of the new version device, a signal 1306 is produced corresponds directly to the signal 1302 produced by the old version device. From the point of view of the new version device, this signal looks like a new version signal transmitted over a channel that severely attenuates frequencies above 10 MHz. Since a new version receiver must be able to process such new version signals, it can process this old version signal in the same manner, without prior knowledge of the signal type.

A new version device will optimally combine the spectral components of the baseband modulated signal 1306 residing at 5 MHz, 7 MHz and 9 MHz. Such optimal combining is performed by the T/16 spaced FFE 704 of the receiver illustrated in FIG. 7. This optimal combining produces a signal having a 2 MBaud symbol rate and that includes each of the spectral copies of the signal 1302 of FIG. 13A. After receive filtering and optimal combining, the old version signal 1302 is indistinguishable from a new version signal.

Figure 14A:
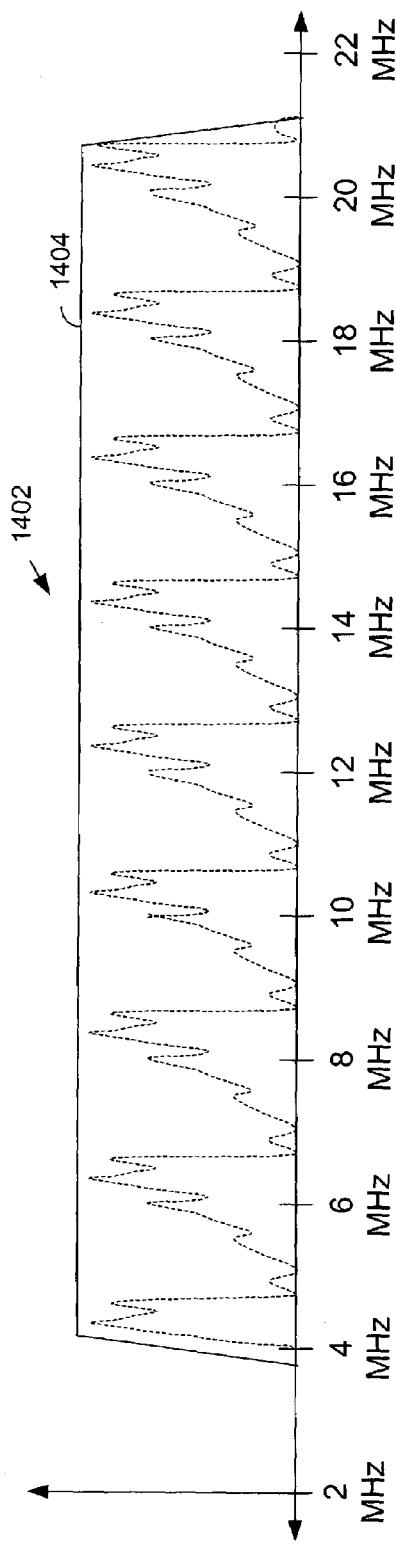
FIG. 14A is a graph illustrating the power spectral density of a new version signal after transmit filtering.

FIG. 14A is a graph illustrating the power spectral density of a new version signal after transmit filtering according to one embodiment in which a sloping power spectral density is not implemented. The signal 1402 of FIG. 14A has been up sampled and transmit filtered so that it includes a plurality of spectral copies of a baseband modulated signal and so that it resides within the frequency band of a corresponding transmit filter 1404. Each of these spectral copies of the baseband modulated signal has a 2 MBaud symbol rate and resides within a respective corresponding frequency band. The signal 1402 shown in FIG. 14A may have been produced by the structures of any of FIGS. 4A, 4B, 10A, or 10B. The signal of FIG. 14A has a frequency band of 4-21 MHz that corresponds to the Mask 2 new version device of Table 1.

Figure 14B:
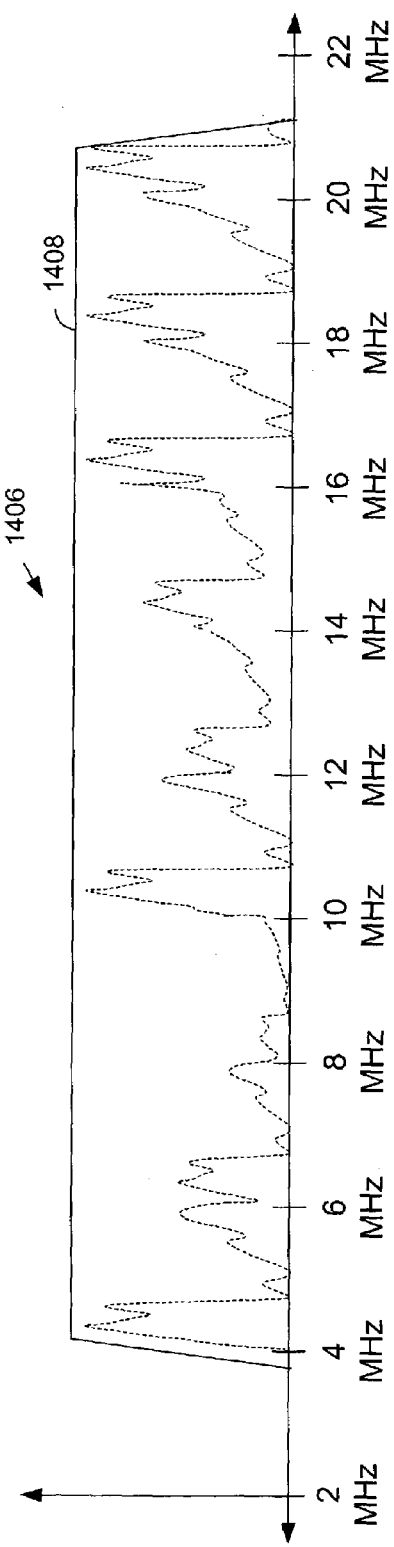
FIG. 14B is a graph illustrating the power spectral density of the new version signal of FIG. 14A after channel attenuation and receive filtering by a new version device.

FIG. 14B is a graph illustrating the power spectral density of the new version signal of FIG. 14A after channel attenuation and receive filtering by a new version device. The signal 1406 of FIG. 14B is representative of a signal that has been transmitted from one new version device, propagated across a media, such as the UTP 112 of FIG. 1, and that has been receive filtered 1408 by another new version device. These new version devices correspond to Mask 2 of Table 1. As is evident, the signal 1406 has been attenuated within some portions of the 4-21 MHz band. This frequency dependent attenuation is common in home network installations.

Thus, the new version signal 1406 of FIG. 14B includes a plurality of spectral copies of the baseband modulated signal, each of which has a symbol rate of 2 MBaud. Each of these spectral copies of the baseband modulated signal has been attenuated to some degree prior to its receipt. Upon receipt by a new version device, the new version device optimally combines the plurality of spectral copies of the baseband modulated signal to produce a signal having a symbol rate of 2 MBaud. This optimally combined signal carries the header of a corresponding data frame. After optimal combining, the signal is indistinguishable from an old version signal received by the same new version device.

Figure 14C:
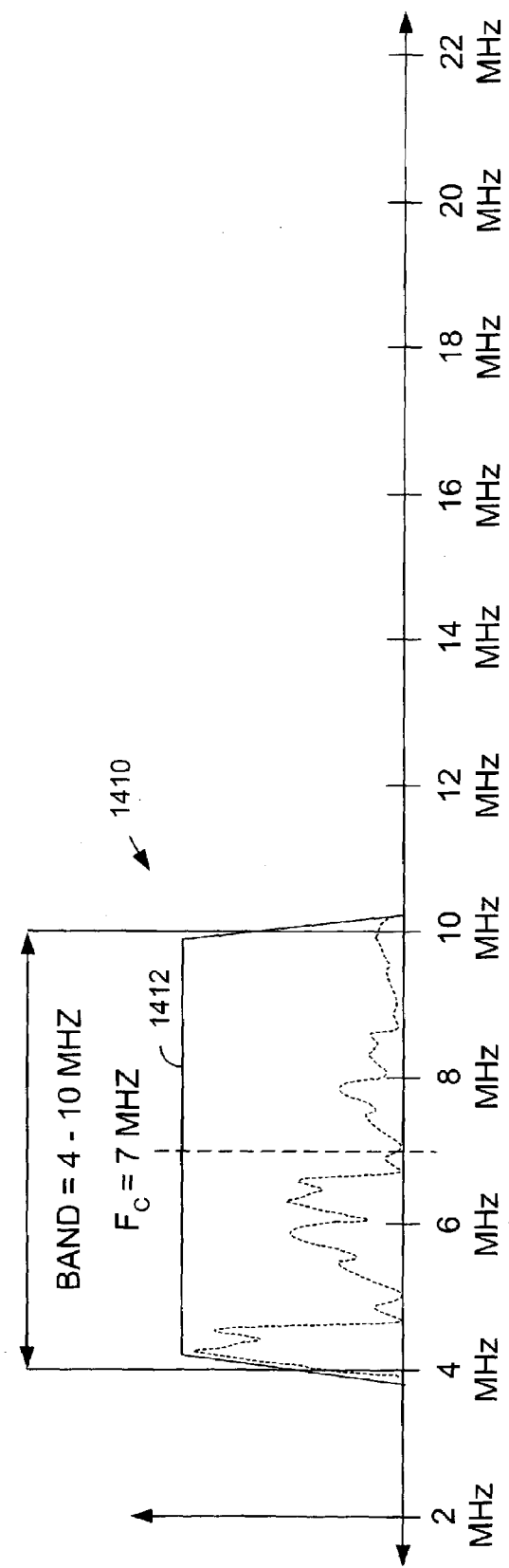
FIG. 14C is a graph illustrating the power spectral density of the new version signal of FIG. 14A after channel attenuation and receive filtering by an old version device.

FIG. 14C is a graph illustrating the power spectral density of the new version signal of FIG. 14A after channel attenuation and receive filtering by an old version device. The old version device that receives the new version signal receive filters the new version signal using a receive filter 1412 to produce a signal with a bandwidth corresponding to the receiver filter 1412. With the signal 1410 of FIG. 14C, the receive filter has a frequency band of 4-10 MHz. Thus, the signal 1410 of FIG. 14C also has a frequency band of 4-10 MHz. After receive filtering by the old version device, the signal is indistinguishable from an old version signal. For example, the signal 1302 of FIG. 13A has spectral components at the same relative positions within the frequency band of 4-10 MHz.

Figure 15:
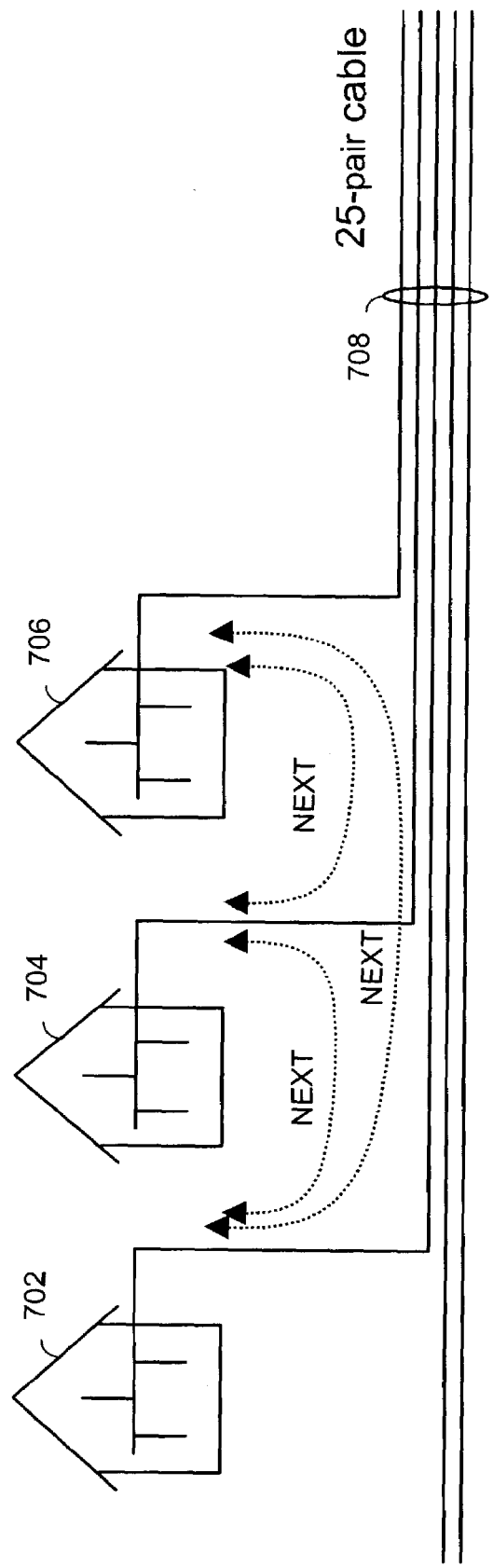
FIG. 15 is a block diagram illustrating the manner in which a plurality of HomePNA networks interconnects with the PSTN.

FIG. 15 is a block diagram illustrating the manner in which a plurality of HomePNA networks interconnects with the PSTN. As shown, each of homes 1502, 1504, and 1506 includes a HomePNA network. Each of these HomePNA networks shares premises wiring with POTS devices and couples to the PSTN infrastructure. With these systems, Near End Crosstalk (NEXT) Energy from non-isolated HomePNA networks escapes into other non-isolated HomePNA networks sharing a cable binder 1508. Such NEXT Energy Creates a time-varying colored noise floor. If receivers within the HomePNA networks are too sensitive, potential privacy issues are created since the receivers can receive transmissions from other non-isolated HomePNA transmitters. The severity of this problem is independent of the HPNA transmit power level.

Figure 16:
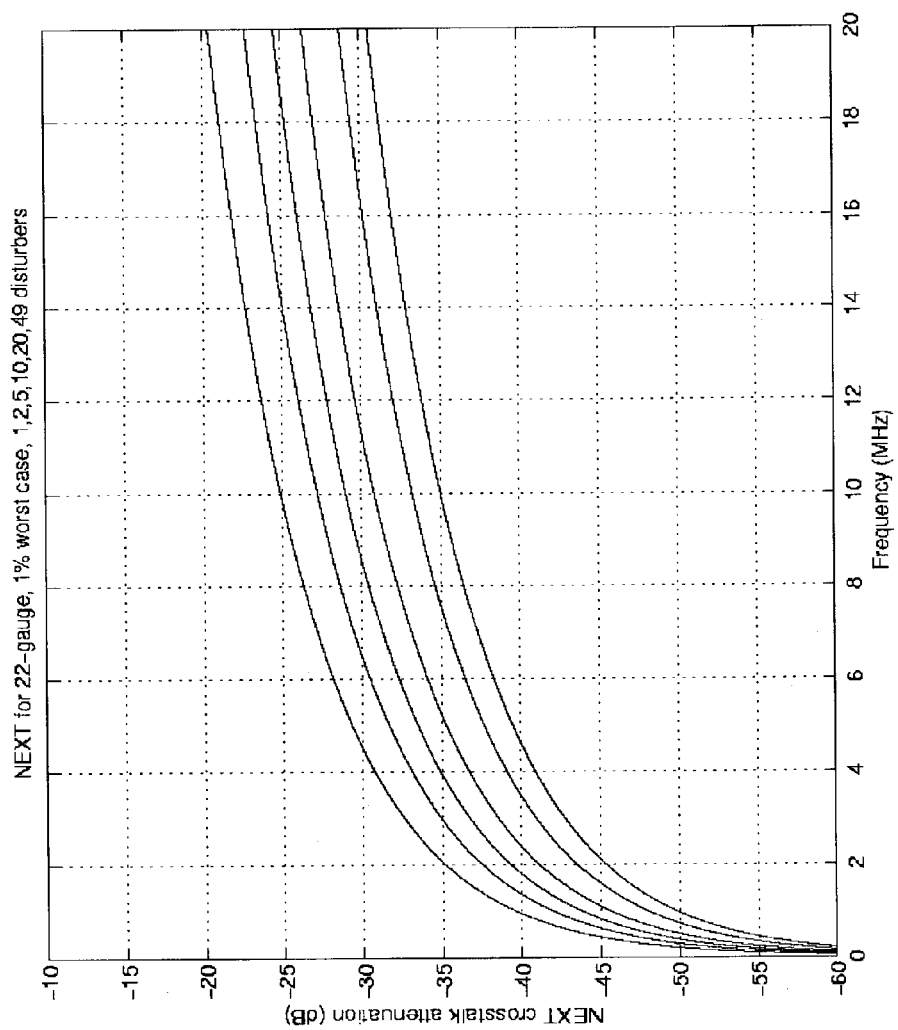
FIG. 16 is a graph illustrating the magnitude of HomePNA average Near End Crosstalk (NEXT) versus frequency.

FIG. 16 is a graph illustrating the magnitude of HomePNA average Near End Crosstalk (NEXT) versus frequency. As shown, the crosstalk gain, $G_n$ may be expressed as:

$$G_n = \chi \frac{f^2}{\alpha(f)} \left(\frac{m}{49}\right)^{\frac{6}{10}}$$

where:

m is the number of interferers f is the frequency x is a scaling constant a is the attenuation factor for the wire As illustrated, NEXT increases with frequency by 15 dB per decade. As can be deduced from the equation, the difference between 49 interferers and 5 interferers (1% worst case) is about 6 dB. Further, the difference between 49 interferers and 1 interferer (1% worst case) is about 10 dB (see J. J Werner, The HDSL Environment, IEEE Journal on Selected Areas in Communication, Vol. 9, No 6, August 1991). The curves of FIG. 16 reflect average crosstalk curves for a plurality of lines within a common media or binder for the above described crosstalk function.

Figure 17:
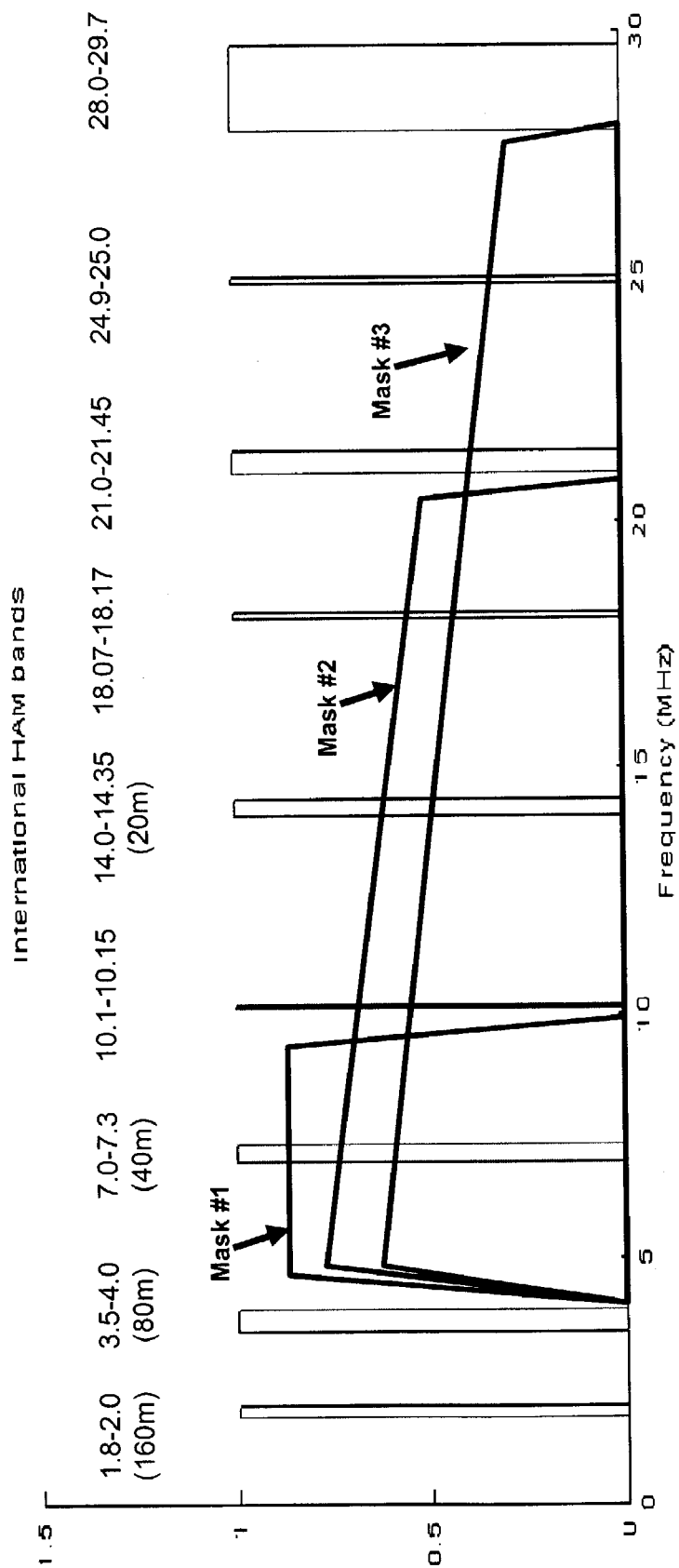
FIG. 17 is a graph illustrating transmit power spectral densities (PSDs) of transmitted signals within the frequency bands of FIG. 2 according to one aspect of the present invention.

FIG. 17 is a graph illustrating transmit power spectral densities (PSDs) of transmitted signals within the frequency bands of FIG. 2 according to one aspect of the present invention. To keep the same total power over a wider spectrum, the PSD must be lower on average. In order to be compatible with old version devices, however, there must be sufficient power in the 4-10 MHz band for robust old version device carrier-sensing. A flat new version signal PSD would not address this requirement for those embodiments in which a total power level is to remain constant for old and new version devices. In order to meet this goal, a sloping PSD concentrates power in the 4-10 MHz band and is achievable with low-order filters. In particular, the PSD of the new version signal, is constructed to have a PSD that slopes downward at 15 dB/decade. The transmitted power in the 4-10 MHz band is within 2 dB of an old version signal at a peak value in the described embodiment of the invention. It is understood, of course, that the peak value may vary and may be equal to or even exceed a peak value of an old version signal. Because old version signals typically utilize a substantially flat PSD curve while the new version signals utilize a sloping PSD curve, it is possible, in an alternate embodiment of the invention, to have a peak value that exceeds a peak value for an old version signal without exceeding total power level restrictions. While there is a slight penalty in insertion loss tolerance between old version devices and new version devices, such result is unavoidable without increasing the total power. In a strictly self-crosstalk limited environment, the PSD shape does not affect capacity. However, in a self-crosstalk+white noise environment, the −15 dB/decade mask has advantages over other spectral shapes primarily because it has a magnitude that is an inverse of average crosstalk coupling thereby creating a reasonably constant white noise floor.

Figure 18A:
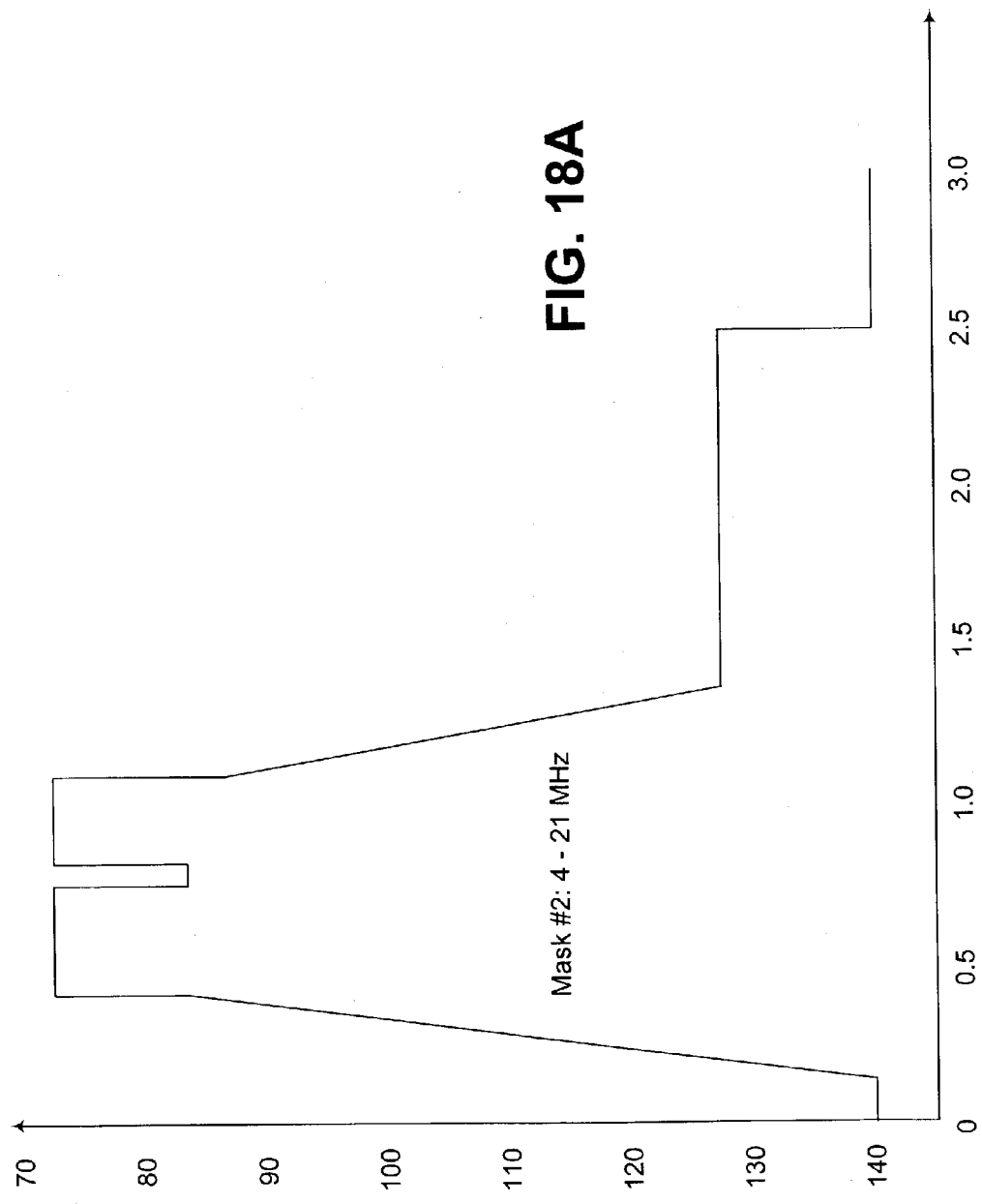
FIGS. 18A-C are three graphs illustrating alternate transmit power spectral densities of transmitted signals within the frequency bands of FIG. 2.
Figure 18B:
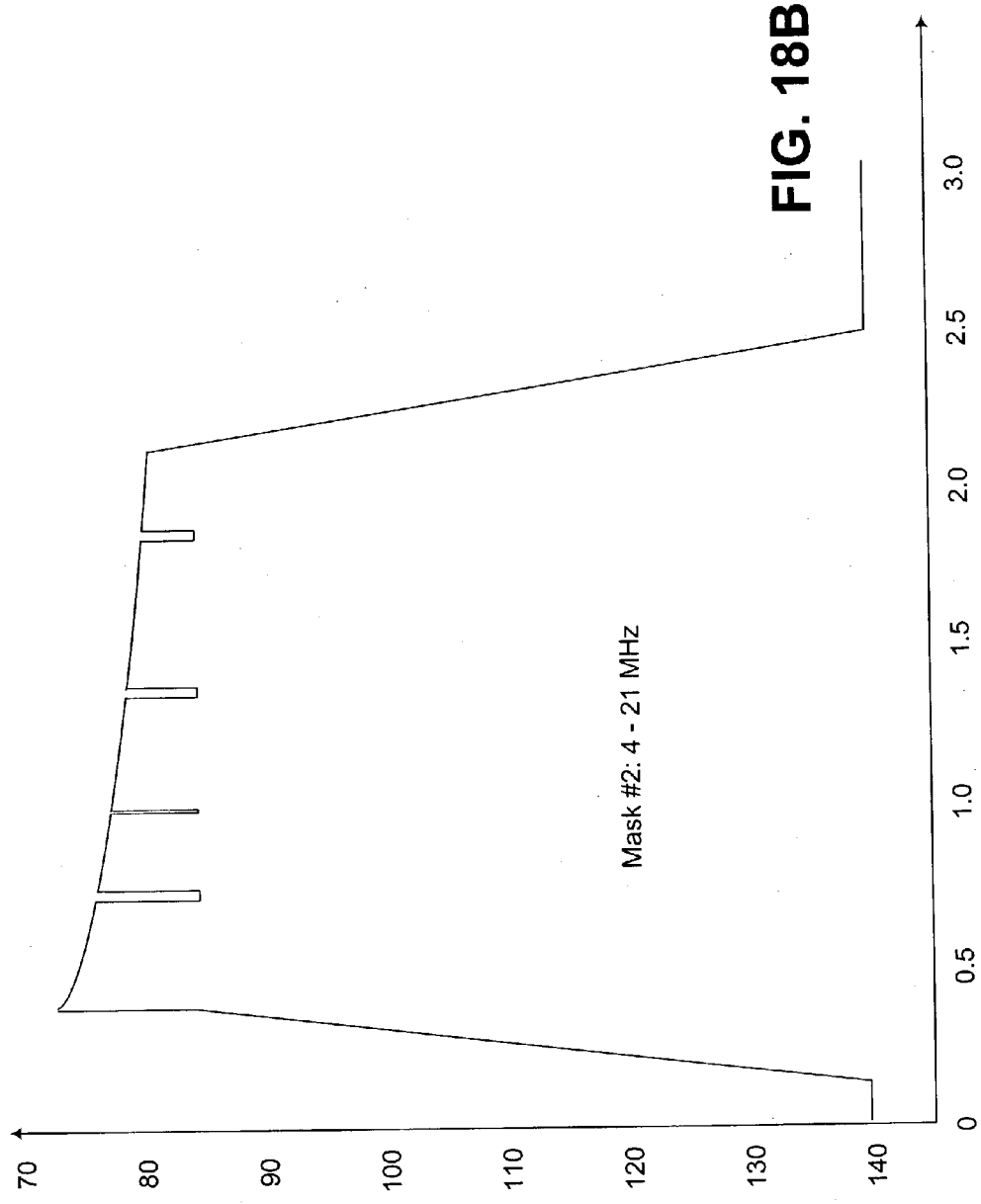
Figure 18C:
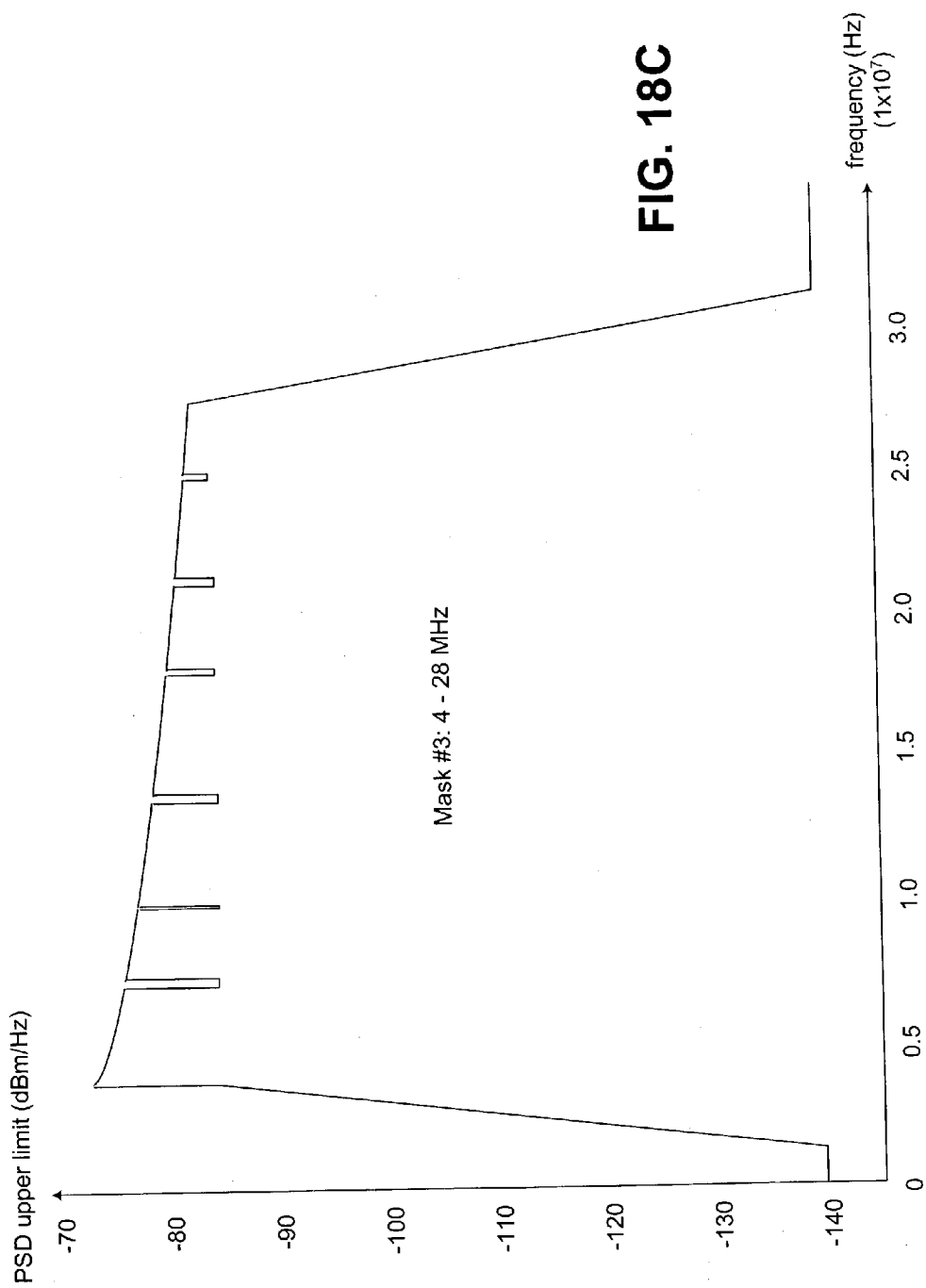

FIGS. 18A-C are three graphs illustrating alternate transmit power spectral densities of transmitted signals within the frequency bands of FIG. 2. A first graph of FIG. 18A represents a transmit mask for the old version signal. The second graph of FIG. 18B is representative of the mask 2 (new version signal) of Table 1. Finally, the third graph of FIG. 18C is representative of the mask 3 (new version signal) of Table 2. As shown, each of PSDs corresponding to Mask 2 in FIG. 18B and Mask 3 in FIG. 18C have downward sloping PSDs, such downward slope corresponding inversely to the 15 dB/decade upward slope of the NEXT average crosstalk attenuation illustrated in FIG. 16.

FIG. 19 is a graph illustrating a power spectral density for a new version signal transmitted in one of a plurality of new version signal frequency bands. As may be seen in the graphs shown generally at 1910, a sloping PSD mask covers a signal frequency band that ranges from approximately 4 MHz to 21 MHz. In the embodiment of FIG. 19, two spectral copies of a new version signal being transmitted at an 8 MBaud rate are shown. More specifically, an old version signal PSD mask 1912 that ranges from 4 MHz to 10 MHz is shown in relation to a new version mask 1914 with a sloping PSD that ranges from 4 MHz to 21 MHz. A signal 1916 transmitted within the new version mask 1914 is shown to have a plurality (two) of spectral copies therefor in relation to the sloping PSD mask. Further, it is understood that while the example of FIG. 19 is that of a signal with a plurality of spectral copies, the signal shown at 1916 may well represent only one signal if the present invention is operated in a mode that does not create spectral copies of a signal for benefits described elsewhere herein this document or, alternatively, that more than two spectral copies may be generated within the sloping PSD mask.

FIG. 20 is a flow chart illustrating operation of the present invention. The method of FIG. 20 will be described in relation to FIG. 19 though it is understood that the graphs of FIG. 19 illustrate but one embodiment of the invention and does not limit the method described for FIG. 20. Generally, the inventive method includes generating one of a new version signal or an old version signal wherein the old version signal has a frequency band that is a subset of the new version signal. For either type of the signal, the invention includes framing and constellation encoding a signal for transmission (step 2004). More specifically, a backwards-compatible home phone line network transmitter for communicating over a home network that supports both new version devices and old version devices includes digital processing circuitry that receives data bits for transmission over the home network and that produces data bits corresponding to home networking frames. A constellation encoder constellation encodes the data bits corresponding to the home networking frames to form a digitally modulated signal that is produced to the transmit filter.

It is understood, of course, that the previously described up-sampling filter for producing spectral copies of the signal may optionally be included herein. Thus, for this embodiment, the backwards-compatible home phone line network transmitter further includes an up-sampling low pass filter operably coupled between the constellation encoder and the transmit filter that is coupled to receive the digitally modulated signal that is utilized in some embodiments of the invention. The up-sampling low pass filter produces a plurality of spectral copies of the digitally modulated signal. Thus, the inventive method includes in one embodiment of the invention, up-sampling the digitally modulated signal to produce spectral copies therefor (step 2006) to provide the spectral copies to the transmit filter or to circuitry coupled between the up-sampling low pass filter and the transmit filter of the various embodiments of the present invention.

The backwards-compatible home phone line network transmitter further includes an up-conversion block coupled between the constellation encoder (or the up-sampling low pass filter if present in the embodiment of the invention) and the transmit filter wherein the up-conversion block up-converts in frequency the digitally modulated signal from baseband to a transmit band that corresponds to the new version frequency band. Thus, the invention includes the step of up-converting the digitally modulated signal from baseband to a transmit frequency band (step 2008).

The various embodiments of the inventive system and method of operation therefor include a transmit filter coupled to receive the digitally modulated signal. The transmit filter transmit filters the digitally modulated signal to produce a transmit signal with a sloping power spectral density (PSD) that meets format requirements of both an old version signal and a new version signal. The sloping PSD of the transmit signal produced by the transmit filter slopes downwardly with frequency across a new version frequency band, wherein the old version frequency band is a subset of the new version frequency.

In the example of FIG. 19, the old version signal is characterized by the first bandwidth and is transmitted within mask 1912. A transmit filter mask ranging in frequency from 4 MHz to 21 MHz (or 28 MHz) is used to create a sloping PSD for the output signal having a slope, in the described embodiment, of −15 dB/decade for a new version signal in the described embodiment of the invention. Thus, the invention further includes transmit filtering the next generation signal with a transmit filter mask to have a sloping characteristic (step 2010).

The described embodiment of the backwards-compatible home phone line network transmitter is designed so that the total power transmission level be maintained from the old to the new version signal transmissions. Thus, as may be seen in FIG. 20, the invention includes transmitting the new version signal wherein a total transmit power does not violate a prior generation total power requirement (step 2012), with a slope that is equal in magnitude to the inverse of average crosstalk coupling from a neighboring signal line coupled within a common binder (step 2014), and wherein legacy devices have good carrier sense of the next generation transmission signal (step 2016). As described before, to achieve good carrier sense requires transmitting a signal with a power level that is within a range of power values that allows an old version device to sense (detect) the new version signal. The actual value here may vary according to device design, sensitivity or other similar factors. One of average skill in the art may readily determine a minimum power level that is required for an old version device to sense a new version signal. Further, while the new version signal is transmit filtered as described above, each of the steps may optionally be omitted for particular networks according to the embodiment of the invention.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the scope of the present invention as defined by the claims.

What is claimed is:

1. A backwards-compatible home phone line network transmitter for communicating over a home network that supports both new version devices and old version devices, the backwards-compatible home phone line network transmitter comprising:
digital processing circuitry for producing data bits corresponding to home networking frames for transmission over the home network;
a baseband encoder that constellation encodes the data bits corresponding to the home networking frames to form a digitally modulated signal;
a transmit filter coupled to receive the digitally modulated signal, the transmit filter transmit filtering the digitally modulated signal to produce a transmit signal, wherein the transmit signal has a sloping power spectral density (PSD) that meets signal format requirements of both an old version signal and a new version signal, wherein the sloping PSD of the transmit signal produced by the transmit filter slopes downward as frequency increases in a new version frequency band, wherein the new version frequency band is wider than and overlays an old version frequency band.

2. The backwards-compatible home phone line network transmitter of claim 1 further comprising an up-sampling low pass filter operably coupled between the baseband encoder and the transmit filter that receives the digitally modulated signal and that produces a plurality of spectral copies of the digitally modulated signal.

3. The backwards-compatible home phone line network transmitter of claim 1 further including an up-sampling block coupled between the baseband encoder and the transmit filter that up converts in frequency the digitally modulated signal from baseband to a transmit band that corresponds to the new version frequency band.

4. The backwards-compatible home phone line network transmitter of claim 1 wherein the downward slope of the sloping PSD of the transmit signal produced by the transmit filter corresponds to an inverse of an average crosstalk gain for a servicing home phone line networking media.

5. The backwards-compatible home phone line network transmitter of claim 1 wherein a maximum PSD of the new version signal produced by the transmitter is less than a maximum PSD for old version signal but has a magnitude sufficient to be sensed by the old version devices of the home network.

6. The backwards-compatible home phone line network transmitter of claim 1 wherein a minimum PSD of the transmit signal produced by the transmit filter corresponds to a maximum frequency of the transmit signal produced by the transmit filter.

7. The backwards-compatible home phone line network transmitter of claim 1 wherein the sloping PSD of the transmit signal produced by the transmit filter has a slope approximately equal to −15 dB per 10 MHz, and wherein the sloping PSD of the transmit signal produced by the transmit filter extends to a minimum PSD value.

8. The backwards-compatible home phone line networking transmitter of claim 1 wherein a total transmit power of the new version signal produced by the transmitter in the frequency band of the new version signal is equal to a total transmit power of an old version signal transmitted by an old version device in the old version frequency band.

9. The backwards-compatible home phone line networking transmitter of claim 1 wherein the old version signal frequency band spans from 4 MHz to 10 MHz and wherein the new version signal frequency band spans from 4 MHz to one of 21 MHz or 28 MHz.

10. The backwards-compatible home phone line networking transmitter of claim 1 wherein the transmitter generates a preamble and header at a 2 Mbaud data rate carrying two bits per symbol and a payload with variable symbol and bit rates.

11. The backwards-compatible home phone line networking transmitter of claim 10 wherein the payload with variable symbol and bit rates are transmitted in one of a plurality of frequency bands of the new version signal corresponding to a receiving device capability.

12. A method for forming a backwards-compatible home networking signal by a new version device in a home network, the method comprising:
forming a new version signal spanning a new version frequency band that overlaps an old version frequency band; and
filtering the new version signal to produce a sloping power spectral density (PSD) that meets signal format requirements for an old version signal, the new version signal having a sloping PSD that slopes downward as frequency increases.

13. The method of claim 12, wherein the slope of the sloping PSD for the new version signal corresponds to an inverse of an average crosstalk gain for a servicing home phone line network media.

14. The method of claim 12 wherein the new version signal has a maximum PSD value that is slightly below a maximum PSD of the old version signal and can readily be detected by an old version device.

15. The method of claim 12 wherein the new version signal has a maximum PSD value that is sufficiently large to be detected by an old version device and the slope of the sloping PSD for the new version signal is approximately equal to −15 dB per 10 MHz and extends to a minimum PSD value.

16. The method of claim 12 wherein a total amount of power for the new version signal is equal to a total amount of power for the old version signal transmitted over the old and new frequency bands.

17. The method of claim 12, wherein the slope of the PSD for the new version signal is approximately equal to an inverse of an average crosstalk coupling gain in a bundle of servicing home phone line network media, wherein the new version signal and an average crosstalk form a constant white noise floor in the bundle.

18. In a wire home phone line communication network that supports a plurality of legacy devices that communicate with signals having a first bandwidth and a first power spectral density (PSD), a method for forming a new version signal for a next generation home phone line network device, comprising:
generating a new version signal having a new version signal bandwidth that is wider than an old version signal bandwidth and wherein the new version signal bandwidth overlaps the old version signal bandwidth;

wherein the new version signal is formed with a transmit filter mask and has a sloping PSD with a downward slope as frequency increases in the new version bandwidth wherein the slope is equal to in magnitude and opposite in slope to the gain of crosstalk from at least one neighboring signal of at least one neighboring signal line coupled within a common binder of a plurality of signal lines; and transmit filtering the sloping PSD of the new version signal to have a specified PSD characteristic wherein a total transmit power does not violate an old version signal PSD requirement.

19. The method of claim 18 wherein the new version signal comprises a header portion and a payload portion, wherein the data rate for the header portion is fixed and wherein the data rate for the payload portion is variable.

20. A method for transmitting a new version signal in a wired home phone line network that includes a plurality of legacy devices that transmit old version signals, as well as a plurality of next generation devices that transmit new version signals, the method comprising:

generating an old version signal format having a header portion and a payload portion, wherein the header portion including a ID of one of the plurality of legacy devices for which the payload is intended, the header portion being transmitted at a fixed data rate; and the payload portion having a first variable data rate;

generating a new version signal format having a header portion and a payload portion, wherein the header portion including ID of one of the plurality of next generation devices for which the payload is intended, the header portion being transmitted at the fixed data rate and the payload portion being transmitted at a second variable data rate; and transmit filtering the new version signal to produce a power spectral density (PSD) that enables one of the plurality of legacy devices to detect and read the header portion of the new version signal to determine that the corresponding payload is for another device.

21. The method of claim 20 further including transmit filtering the new generation signal to have a PSD that slopes downward with increases in frequency.

22. The method of claim 21 wherein the slope of the PSD of the new version signal counteracts gain from crosstalk coupling.

23. The method of claim 21 wherein the slope of the PSD of the new version signal is approximately equal to −15 dB/10 MHz.

24. The method of claim 20 wherein a transmission power level of the new version signal is equal to a transmission power level of the old version signal.

* * * * *